United States Patent
Keener, Jr. et al.

(10) Patent No.: US 8,019,815 B2
(45) Date of Patent: Sep. 13, 2011

(54) INTERACTIVE AUDIO/VIDEO METHOD ON THE INTERNET

(76) Inventors: Ellis Barlow Keener, Jr., Brookline, MA (US); Vishal Kumar, Lowell, MA (US); Ram Ranjan Srivastav, Brookline, MA (US)

( * ) Notice: Subject to any disclaimer, the term of this patent is extended or adjusted under 35 U.S.C. 154(b) by 755 days.

(21) Appl. No.: 11/739,096

(22) Filed: Apr. 24, 2007

(65) Prior Publication Data
US 2008/0270541 A1    Oct. 30, 2008

Related U.S. Application Data

(60) Provisional application No. 60/745,517, filed on Apr. 24, 2006.

(51) Int. Cl.
*G06F 15/16* (2006.01)
(52) U.S. Cl. ........................................ 709/204
(58) Field of Classification Search .................. 709/204
See application file for complete search history.

(56) References Cited

U.S. PATENT DOCUMENTS

| | | | | | |
|---|---|---|---|---|---|
| 5,493,658 | A * | 2/1996 | Chiang et al. | ............... | 715/709 |
| 6,144,991 | A * | 11/2000 | England | ............... | 709/205 |
| 6,155,840 | A * | 12/2000 | Sallette | ............... | 434/323 |
| 6,463,460 | B1 * | 10/2002 | Simonoff | ............... | 709/203 |
| 6,470,170 | B1 * | 10/2002 | Chen et al. | ............... | 434/350 |
| 6,691,159 | B1 * | 2/2004 | Grewal et al. | ............... | 709/219 |
| 7,379,704 | B2 * | 5/2008 | Parker et al. | ............... | 434/350 |
| 7,379,848 | B2 * | 5/2008 | Yu et al. | ............... | 702/186 |
| 7,478,086 | B2 * | 1/2009 | Samn | ............... | 707/4 |
| 7,533,146 | B1 * | 5/2009 | Kumar | ............... | 709/205 |
| 2001/0032244 | A1 * | 10/2001 | Neustel | ............... | 709/206 |
| 2002/0167539 | A1 * | 11/2002 | Brown et al. | ............... | 345/705 |
| 2005/0238156 | A1 * | 10/2005 | Turner | ............... | 379/202.01 |

OTHER PUBLICATIONS

Patents Hoteling Program, "Nortel Networks MCS 5100 Collaboration Tool Using Meet Me and Web Collaboration Tool Module", pp. 4.51 to 4.58 and 5.1 to 5.41, Dec. 22, 2006.*
MCS-5100 Meet Me and Web Collaboration Quick Reference Guide, V.1.0. Feb. 2006.*
MCS 5100 Quick Reference Guide, Version 2.2, Feb. 2006.*

* cited by examiner

*Primary Examiner* — Krisna Lim

(57) ABSTRACT

A method and system for providing live entertainment and teaching using interactive video and audio over an open internet connection to multiple viewers. The entertaining talent-person or teacher is located in various places and locations. In each location the talent-person talks about a particular subject such as cooking, travel, physics, farming, music, politics, or baseball and is broadcasting live audio and video of the talent-person through a camera and microphone connected to a computer, which is connected to the internet. The viewers see and hear the talent live by watching a web page on the viewers' devices connected to the internet. The viewers are able to comment and ask questions to the talent-person through chat input available on the web site. The talent-person to reads the viewer's comments and questions and responds to the question.

51 Claims, 22 Drawing Sheets

INTERACTIVE AUDIO/VIDEO METHOD ON THE INTERNET

FIELD OF THE INVENTION

The present invention relates to methods and a business process, and more particularly, to methods and processes of providing live entertainment and teaching by talented-persons communicating by speaking live with a microphone and with a camera displaying the talent-person live and having the talent-person's live voice audibly and visually in real-time communicated to viewers on the internet and having the viewers communicate back to the talent-persons.

BACKGROUND OF THE INVENTION

Visual/audio transmission over the internet has been occurring from at least since 1984. For example, CU-SEEME was providing audio/visual transmissions since 1984 allowing users to communicate with each other using internet addresses or through private conference. The private conference is set up as a logged-in system where all the participants talk to each in chat rooms. The purpose of the conference discussion was not unlike persons communicating privately by telephone one to one. Later as webcam developed, persons communicated using video/audio and chat, where both parties communicated by audio and/or text chat either one to one or privately one to many. These events required the participants to register or log in, or were not live, or did not include audio with the visual or did not allow the viewers.

Later, streaming recorded video of television news broadcasts were conducted over the web where the communication was one-way using audio and video from the news announcer to the viewers without communication from the viewers or ratings from the viewers to the news announcer. Still later there were occasionally live streaming shows where news broadcasts provided through streaming video/audio to the web viewer-audience but again, these video/audio streaming events where like television in that they were one-way from the news announcer to the viewer.

DISCLOSURE OF THE INVENTION

The present invention addresses the above stated needs by providing enhancements The prior art knowledge disclosed above just provides for persons on the internet to enter a secured chat room and have audio/visual/chat conversations with other persons in the chat room. Moreover, the prior art knowledge disclosed above just provides for news announcers to provide one-way audio/visual communications with the viewer-audience without input from the viewer-audience.

Accordingly, there is a need to provide a for an method where viewer-audience can open a web page on a internet device, and without logging-into closed web site, view talent-person communicating by having a) a camera transmit live streaming video of the talent-person combined live audio of the talent-person to multiple viewers and b) the viewers communicating to the talent-person through text chat and real-time rating system followed by the talent-person responding to the viewers comments and/or questions through talking on the camera and microphone with all of said communication being conducted only the internet.

SUMMARY OF THE INVENTION

In accordance with a first aspect of the present invention, there is provided a method of entertaining, teaching, tutoring or providing technical support through live audio/video internet streaming using cameras, microphones, a mobile talent computer and an internet connection to send live audio/visual transmissions of a talented entertainer, expert, or teacher over the internet to viewers watching, listening and interacting with the talent person on the viewers' computer devices. The transmission is sent from one or more talent-persons to multiple viewers in diverse geographic locations.

BRIEF DESCRIPTION OF THE DRAWINGS

FIG. 22 schematically shows the process of viewers' watching the transcription of talent person's talk in the Internet browser and of the number of viewers watching.

BEST MODE FOR CARRYING OUT THE INVENTION

Figure 1:
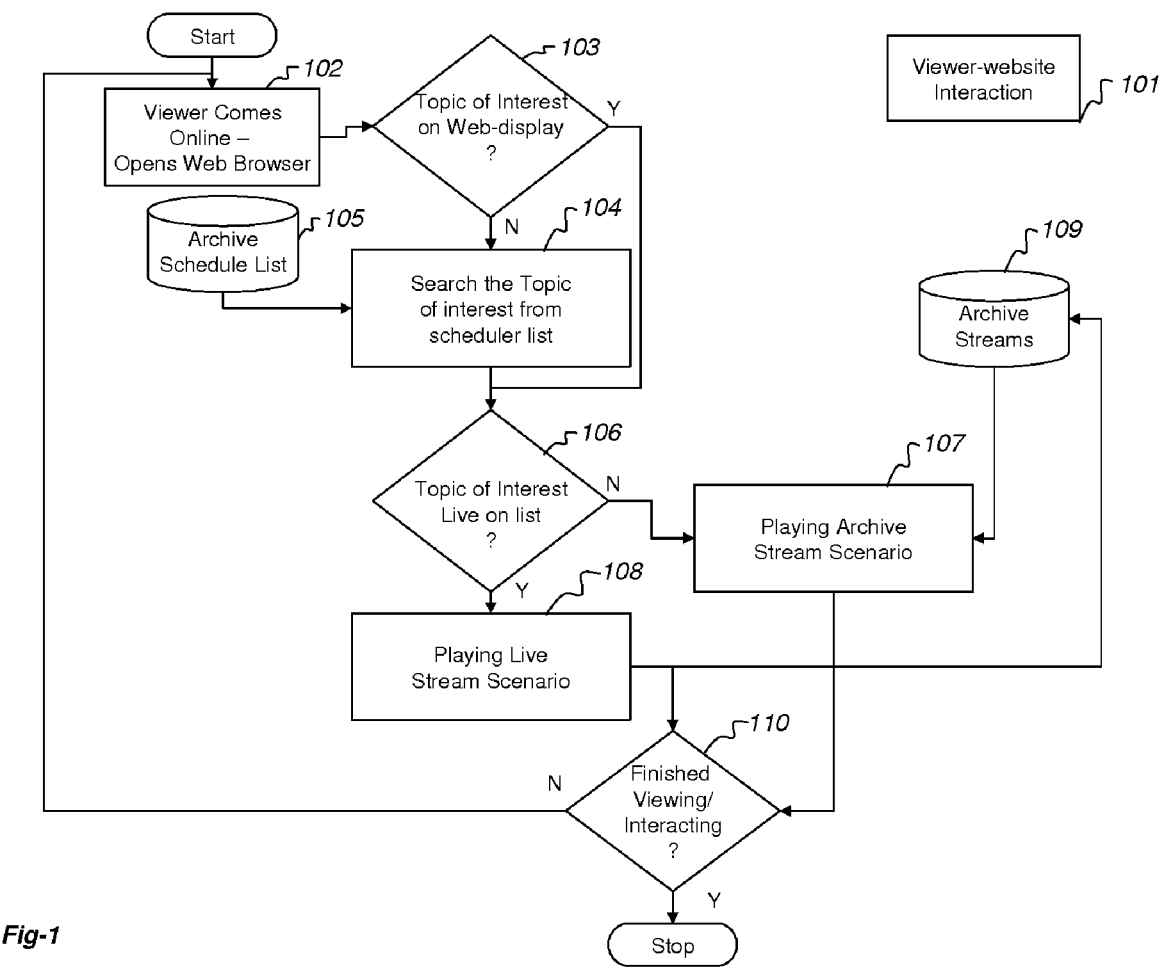
FIG. 1 schematically shows the architecture of the overarching process for the interaction between the viewer and the website system of the present invention, including additional components detailed in the following drawings.

The present invention utilizes a system for several parts including a presenter's computer, central server, a web viewer's computer, and an archive server. The preferred embodiments, discussed below, relate to one way to use the invention though other ways may also be used. The presenter's computer is built using series of Java applet stitched using signed JAR files. The Java applet will help the web viewer's computer to open session with the central server without installing any special software on web viewer's computer. Only requirement at web viewer's computer will be, to have Java compatible browser which most of updated current browser have. The JAR will help the web viewer's computer to operate chat with other users, another question and answer session with presenter, and the rating engine. The webpage is written using various scripting languages such as PHP, Perl, or html. For the web viewer's computer, a video media payer, such as Microsoft's Windows Media Player template is used which again will not pose any complication on the web viewer's computer to install special software.

The presenter's computer consists of another Java applet based tool to show question and answer session, rating engine and various related information. The interfacing pages for the presenter's computer are created using PHP or Perl. The presenter computer's video feed is handled using third party tools to capture feed and uni-cast the video from the presenter's computer to the central server.

The central server is heart of the system. The central server may run various servers delivering tools to the system such as a chat server, a question and answer server, various filter tools like a chat content filter, a content processor, an adaptive advertisement pusher and various other interactive scripts for handling login, a rating engine, blogs, picture sharing server, and various query scripts for datacenter linkage written in various scripting languages such as Java, Perl, C/C++. The central server may also consist of a relay server to retransmit Presenter computer video and chat as unicast to multiple users The relay server may be used as an open third party tool such as Darwin Streaming Server. Database used may be written in MySql. Various tables are created in Mysql to handle user information, web cast schedules, user activity tracking, rating information, blog information, channel details and other web content stored in the forms of various Mysql tables for optimal data management.

The storage server consists of database information along with archived casts and various presenter and chat content information. Other performance alternatives to existing technology are JSF to replace Java Applet and Microsoft based .Net framework is another direction of consideration for future run for logic. MySQL may be replaced by Oracle/SQL server based on amount of data to process. Streaming viewer WMP may be replaced by Flash Streaming Player and similarly Flash streaming server can replace current Darwin media server based on amount of traffic and bandwidth. J2ME and other mobile platforms with similar algorithms will be used to incorporate mobile phone interactive tools linked to the central server.

A typical process flow for a web viewer initially using the system is show in FIG. 1, the Viewer Website Interaction (Module:101) shows a typical process flow followed by a web viewer. The process begins with the web viewer coming online to the system website written using PHP, Perl, C/C++ with J2EE code (Module:102). After opening the website, the web viewer will select the viewer's topic of interest to watch on video on the viewer's web browser or video media player. Once the web viewer finds the viewer's topic of interest using search engine code residing for searching website or posted featured topics as a result of scheduler and policy defining code (Module:103), the web viewer will move to the web page with the video using a URL. In another scenario, the web viewer will use similar search mechanism and will search for the topic of the web viewer's interest (Module:104) from Archive Schedule list from Archive server (Module:105). If the web viewer find what the web viewer is looking for and the topic of interest is live at that instance (Module:106) or scheduled to happen live in future, the web viewer can open a live streaming scenario task at appropriate time (Module:108). The live video session is also archived (Module:109) for future usage and the web viewer may open the archive video stream scenario to proceed (Module:107). After the web viewer is finished with viewing the live or archived video, the web viewing is considered as serviced and treated as new event if the web viewer proceeds with similar repeated cycle on other topics of interest (Module:110).

Figure 2:
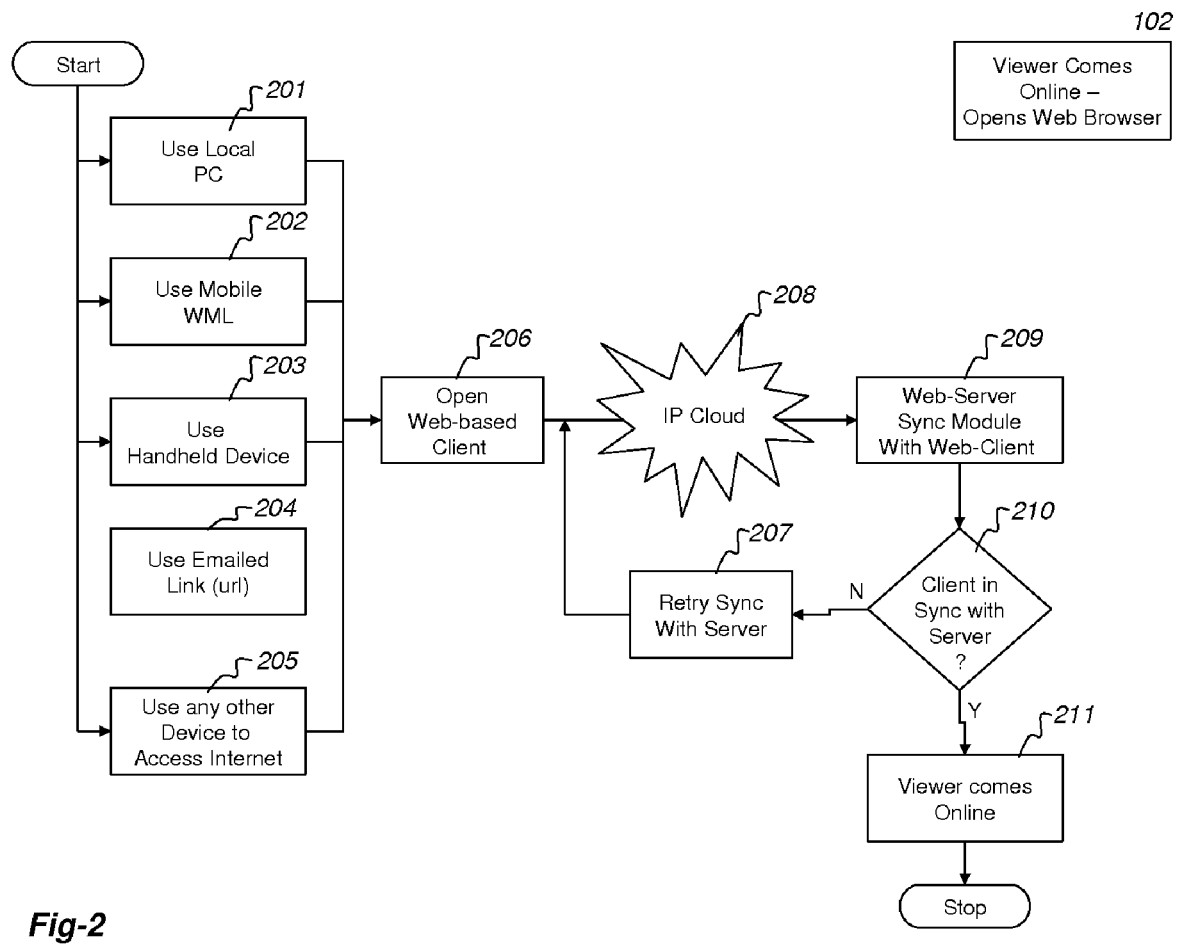
FIG. 2 shows an embodiment of the process of the viewer's startup process of accessing the web device providing content made available by the system created by the present invention.

The first step the web viewer takes towards starting the web viewer's interaction with main server is shown is in FIG. 1 Module:102 and shown in more detail in FIG. 2: Viewer Comes Online (Module:102 and (Module:1001). The web viewer comes to website using following commonly available links such as direct links on website using the web viewer's computer or termed as Local computer using any normal browser to open the web site written in PHP, Perl and J2EE (Module:201). Links may surfed by mobile devices opening sites written in WML or normal websites using common browsers of smart-phones (Module:202). Also, various other handheld devices using the web viewer's browsers provided by the manufacturer of devices may be used (Module:203). The web viewer may also use emailed links which are sent from various known mechanisms such as "Invite a Friend" or "Email link" (Module: 204), or by use any other peer capability devices not mentioned in this list (Module:205). Using the required anticipated method a web viewer may choose to open a link for a Topic of Interest. The web viewer's browser client opens (Module:206) on the web viewer's access devices. The client consist of WMP player loaded from Microsoft website or other similar encoded video along with Chat and a question and answer window using Java Applet and running various advertisements as a result of smart filter based on the web viewer's interest and site traffic. These smart filters are written in Java. The client when loaded completely on the web viewer's window will now start interacting with the web-server and establish a sync with web-server (Module:209) using the normal IP cloud (Module:208). If the Client session is established and server-client sync is established (Module:210), the web viewer will be treated as online user, and if not, a circular loop to retry sync between client and server (Module:207) is started which is a self-healing loop with various checks for troubleshooting the problem. If something from system is causing the problem, the system will report the error.

Figure 3:
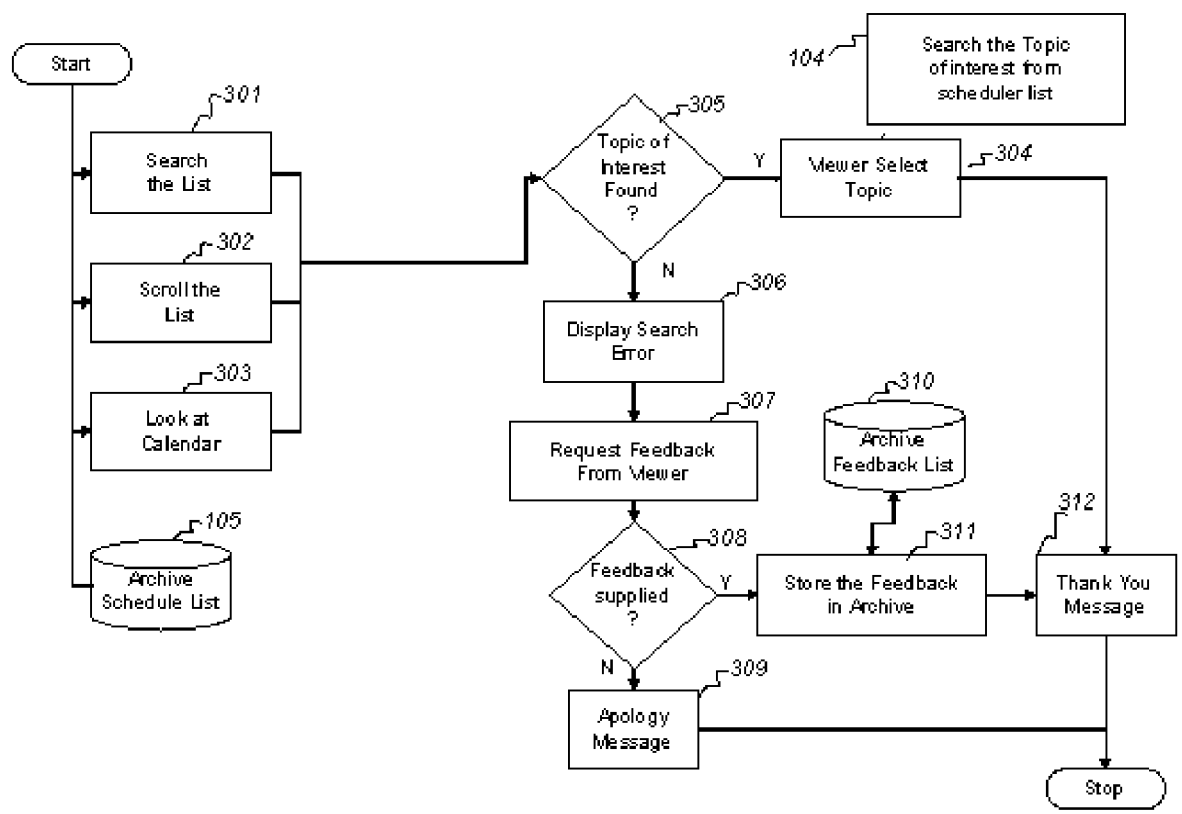
FIG. 3 shows the operations being part of the process of the search by the viewer to find the topic of viewer's interest in the archived or live scheduler lists provided in the viewer internet device interface.

As shown in FIG. 1 Module:104, this module is responsible to help the web viewer to search the topic of interest and help viewer in getting answer for the viewer's search. See FIG. 3: Search the Topic of Interest (Module:104). The viewer in this mode normally have three options: first to search from list (Module:301), second to scroll an existing list (Module:302) posted as a result of MySQL query for fetching a list based on various interests, and, third, to look at the calendar (Module:303) provided using various standard open source scripts for Php, Perl, or MySQL interaction. All these methods are drafted using mix of computer languages such as Php or Perl script and Mysql queries. After looking at the available methods the web viewer selects a topic (Module:304). If this is the topic the web viewer is looking for (Module:305), a thank you note is posted to the web viewer and process is moved on to next stage which is to find if topic of interest live on the list or archived (Module:106), else, an appropriate error message about the search is displayed using various exception handling events (Module:306) and user is taken to Feedback engine (Module:308) which will ask for users feedback, if user wished to provide feedback, user feedback is taken (Module:311) and it is send to feedback archive represented as another database kept in archive server (Module:310) followed by thank you note, else appropriate apology message is displayed (Module:309) to user.

Figure 4:
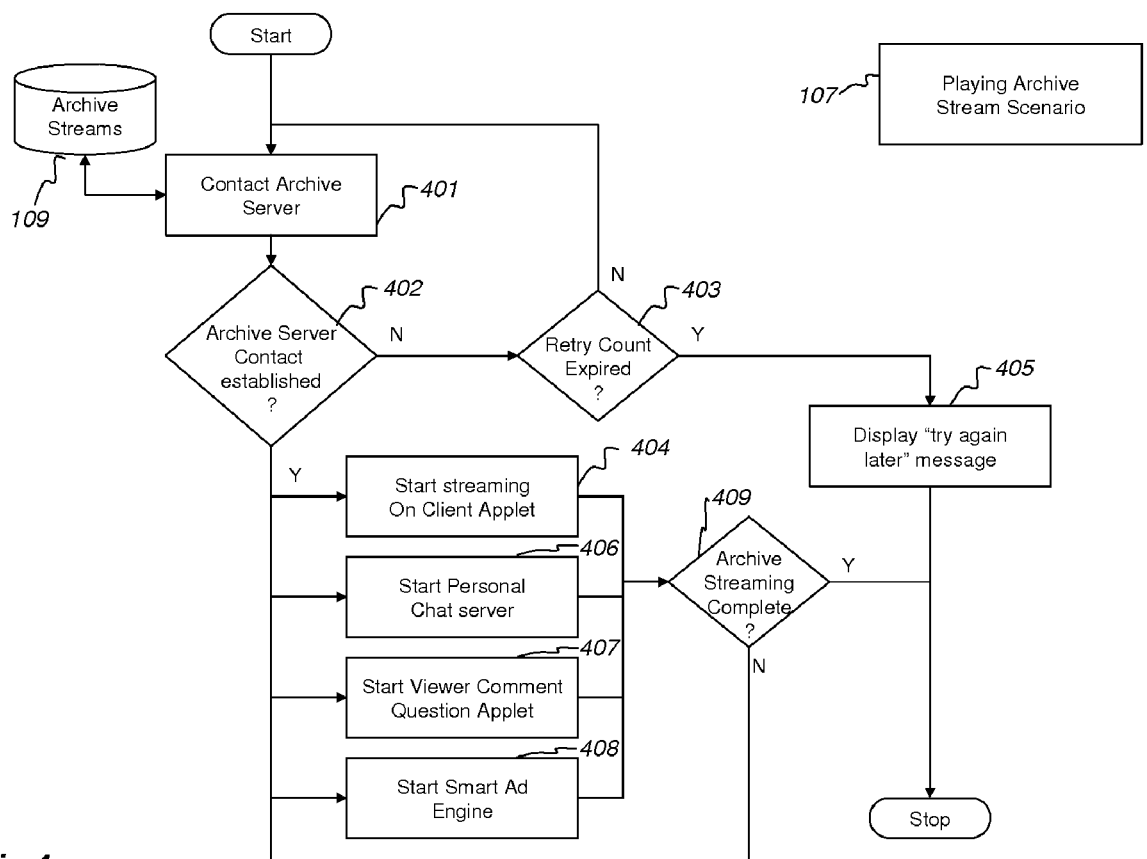
FIG. 4 shows the operations being part of the process of viewing the archived streaming audio/video feeds made available as part of this system.

Description FIG. 4: Playing Archive Stream Scenario (Module:107) As described in FIG. 1, archive server is responsible for managing archive streams and contents. Initially a contact request is send to establish a contact from client computer with Archive server (Module:401). If archive server contact is not established (Module:402), retry count decreases, if retry count decreases (Module:403) an error message to request user to try again is posted to balance and manage server load. If retry count is not expired (Module:403) new contact request is send to establish contact with archive server. If archive contact is established (Module:402), following module will start: Firstly client-server stream link is established and stream starts (Module:404), personal chat server is started (Module:406), the question and answer window is opened (Module:407), along with pushed advertisements from smart advertising engines (Module:408). As soon as streaming session is complete (Module:409), archive scenario complete.

Figure 5:
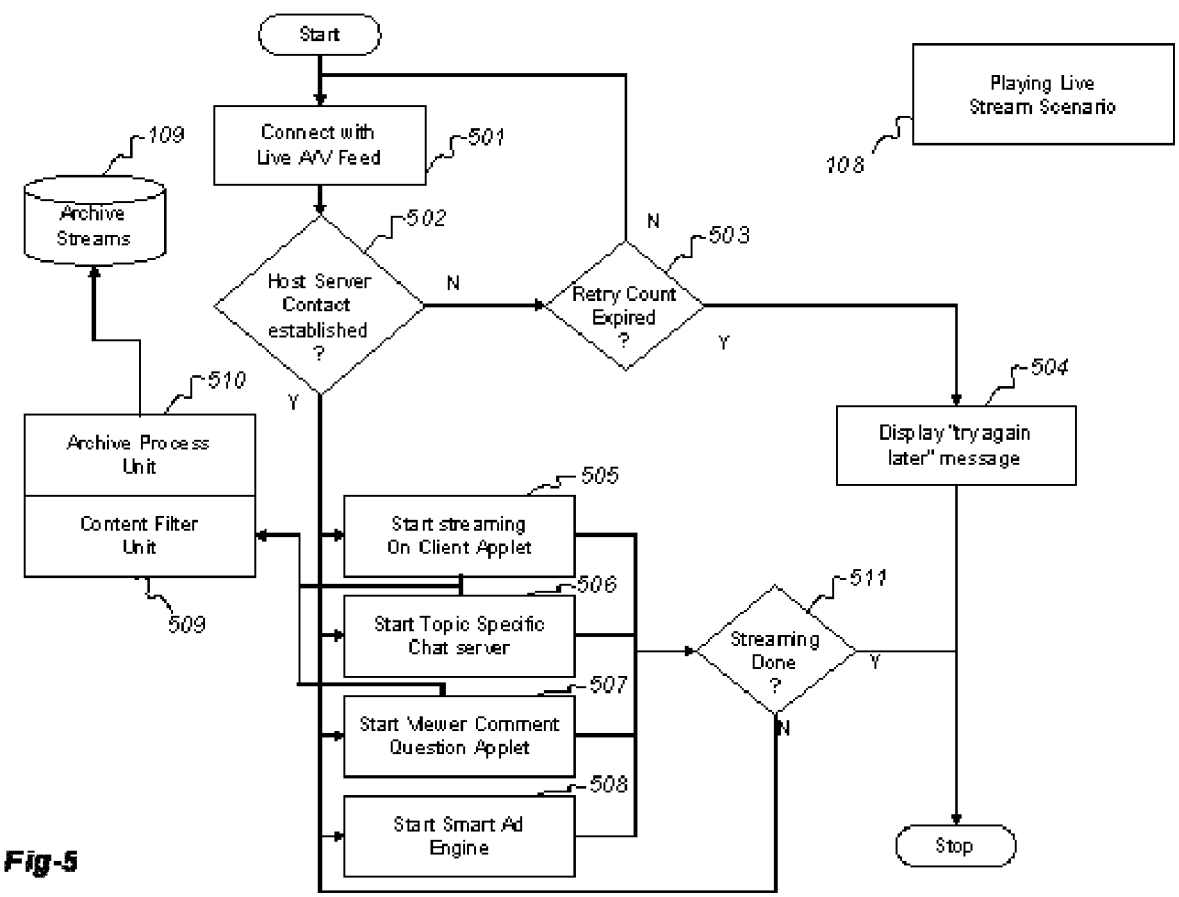
FIG. 5 shows the operations being part of the process of viewing the live streaming audio/video feeds made available as part of this system.

Description FIG. 5: Playing Live scenario (Module:108) As described in FIG. 1, archive server is responsible for managing archive streams and contents. Initially a contact request is send to establish a contact from client PC with live relay feed server (Module:501). If host server contact is not established (Module:502), retry count decreases, if retry count decreases (Module:503) an error message (Module:504) to request user to try again is posted to balance and manage server load. If retry count is not expired (Module:503) new contact request is send to establish contact with host server. If host server contact is established (Module:502), following module will start: Firstly client-server stream link is established and stream started (Module:404) which is also relayed to content filter unit (Module:509) which will audit content and extract various information for various profile analyses and study, which is then send to archive server (Module:109). Along with Module:505 personal chat server is also started (Module:506), the question and answer window is opened (Module:507), along with pushed advertisements from smart advertising engines (Module:508). As soon as streaming session is complete (Module:511), live stream scenario is complete.

Figure 6:
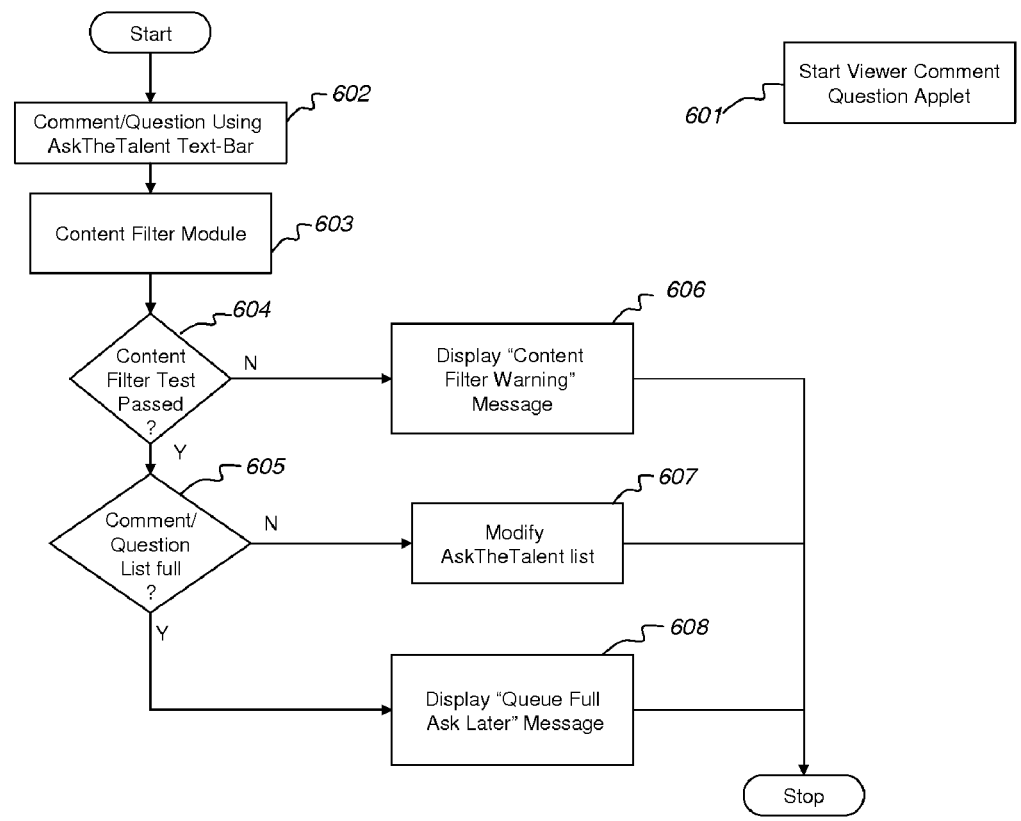
FIG. 6 schematically shows the steps in the process for handling the viewer's comment or questions and the predefined automatic filtering process inherent to the present invention.

Description FIG. 6: Start Viewer Comment Question Applet (Module:601) This module will take care of the question and answer chat content processor. Once this module is started, using Ask The Talent Text-Bar (Module:602) user input is taken and sent to content filter module (Module:603). Content filter module is a series of checks which will make sure content is appropriate to chat room theme and filter the content which does not belong to particular session. Content filter will also take care of processing and filtering information and help adaptive advertisement pusher engine to throw required advertisements. If the content filter test is not passed (Module:604) "Content Filter Warning is posted to submitter" (Module:606). If content passed filter test (Module:604), the message is send to the question and answer window queue. If Comment/Question queue is full (Module:605), a message stating "Queue Full Ask later" is posted, else, question is posted in talent list (Module:607).

Figure 7:
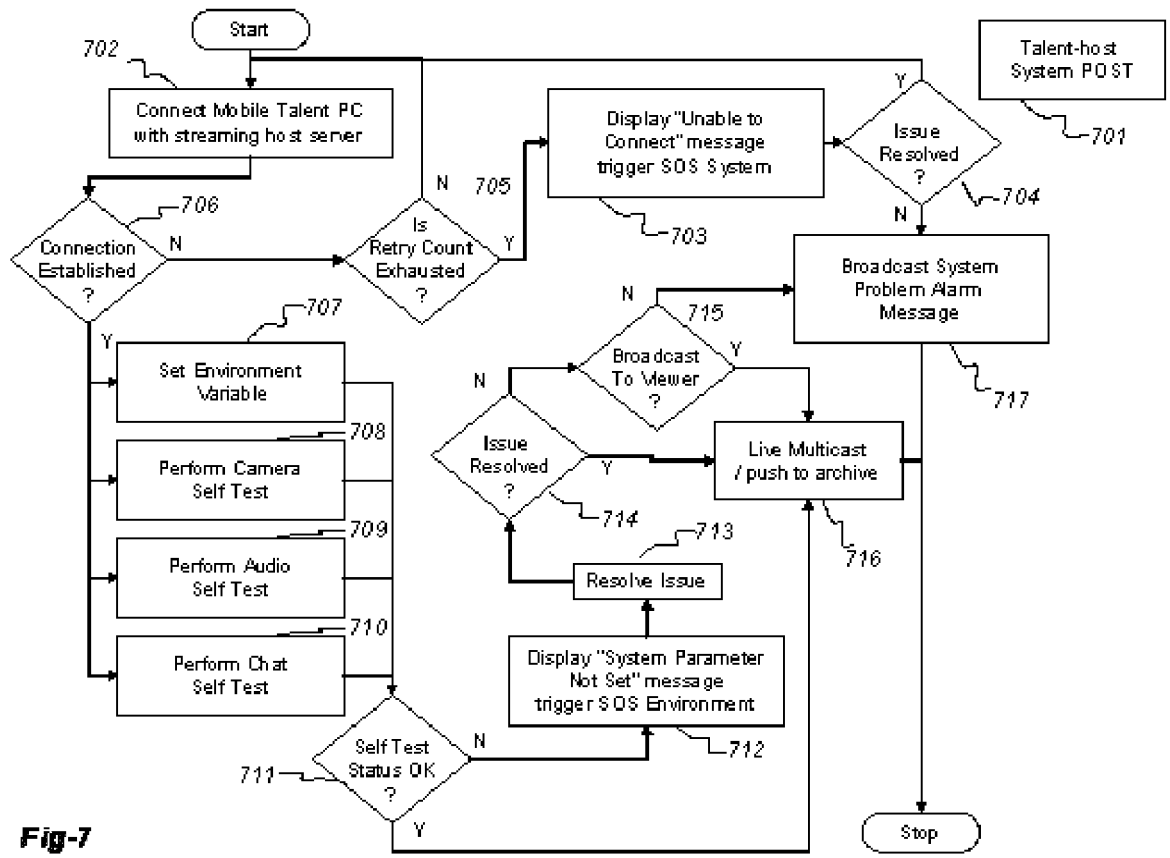
FIG. 7 schematically shows the startup process for the mobile talent-host system.

Description FIG. 7: Talent-host System POST (Module:701) This Figure talks about how talent PC POST is conducted. At first a connect is established between talent PC with streaming host server (Module:702). Is connection established is not confirmed (Module:706), decrease retry attempt count, if retry count is not exhausted (Module:705), retry another connect attempt. If retry count is exhausted (Module:705), "Unable to Connect" message is posted (Module:703) on talent PC and Priority 1 service request is triggered to make available another working system to make sure ontime show delivery. If the connectivity issue is resolved (Module:704) another connect attempt is established (Module:702), if issue is not resolved (Module:704), broadcast system problem alarm to all concerned units (Module:717). If connection is established (Module:706), following modules are triggered: set environment variable (Module:707), perform camera self test (Module:708), perform audio self test (Module:709), perform chat self test (Module:710). Such tasks are run on mix of $3^{rd}$ party tool and custom made software to create a complete self test module. If self test status is okey (Module:711), start live multicast and make arrangements for archiving the live feed (Module:716). If self test status is not okey (Module:711), trigger "System Param not set" message and open Priority 1 request to expedite the problem resolution (Module:712). After issue is resolved (Module:714), proceed with live web telecast and archive the session. If Issue is not resolved (Module:712), Broadcast to viewer is successful (Module:715), then proceed with live web telecast and archive the session. If broadcast to viewer is not successful (Module:715), broadcast system problem alarm to all concerned units (Module:717).

Figure 8:
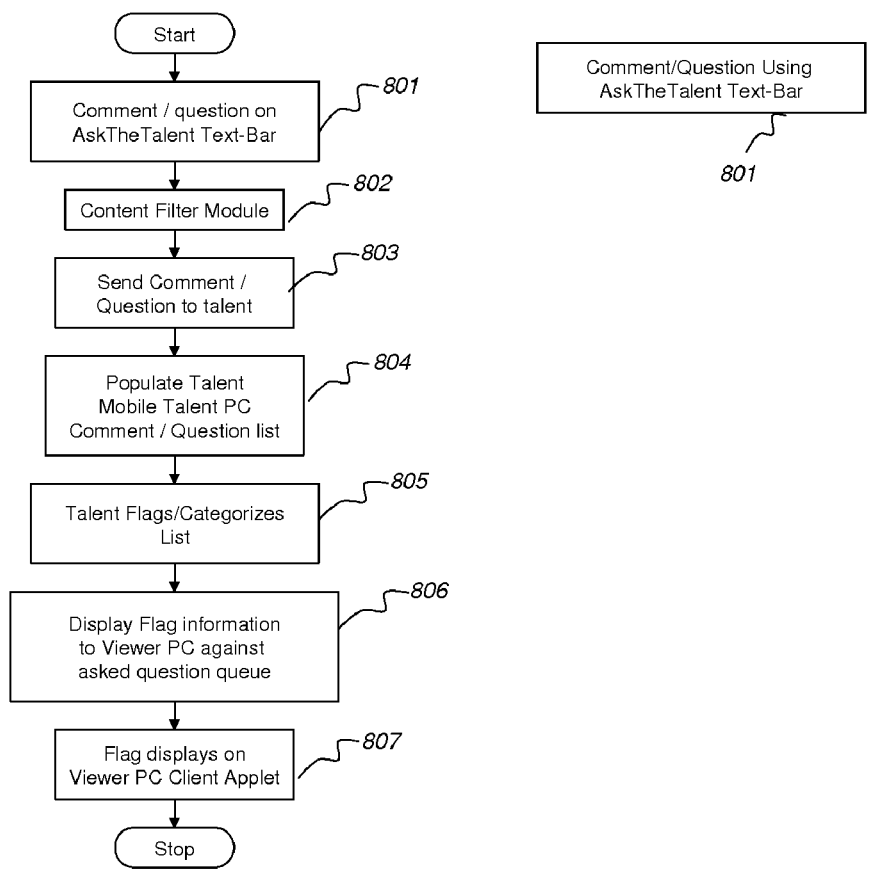
FIG. 8 shows an embodiment of the process of handling comments or questions asked by the viewer using the Ask-TheTalent text-bar in the viewer's internet device and actions taken by the automatic filter and the talent-person in adding the appropriate flag to the said comment or question.

Description FIG. 8: Comment/Question Using AskTheTalent Text-Bar (Module:801) This module is responsible for handling Comment/Question chat. Firstly message is taken from user using AskTheTalent Text-bar in Coment/Question chat window (Module:801). This message is then send to content filter module (Module:802), which process this information and make sure information is filtered and appropriate information is passed to next stage. After filter chat is send to presenter PC (Module:803). After message is posted to talent PC, it is also multicasted to User windows (Module:804). Using manual process Talent flags the question if its being answered in the list (Module:805). After the modification is made and injected in talent PC the flag is pushed to user PCs (Module:806). Flag and message displays on user PC clients (Module:807).

Figure 9:
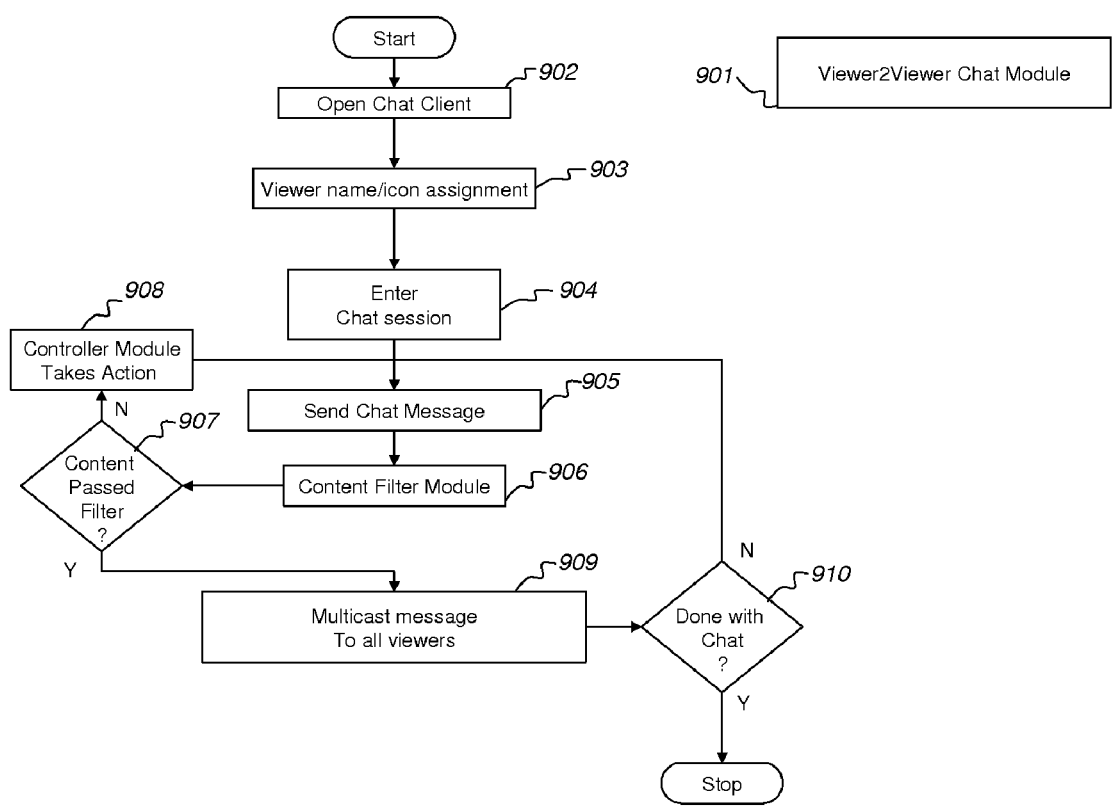
FIG. 9 shows a number of operations being part of the process from starting up to completing a viewer initiated open or personal chat session.

Description FIG. 9: Viewer2Viewer Chat Module (Module:901) This Figure explains User2User chat interaction. After user opens a chat client successfully on client applet (Module:902), After user logins and allotted name/icon is assigned to that user (Module:903), upon login his name and/or icon displays as his opening signature and chat room is informed about user entering chat room and an active connection is established between the user and chat room (Module:904). Using text-box, the web viewer can inject the web viewer's chat in the chat server using send button or press return (Module:905). After the web viewer sends the web viewer's chat, content filter comes into play (Module:906). If content passed filter, message is multi-casted to the group. If the content filter finds this message as inappropriate it drops the message and send warning notification to submitter and get back to Module:905 for another user input on chat room. If chat session is done user is safely logged out of the chat session, else, get back to send chat message mode (Module:905) for taking further inputs.

Figure 10:
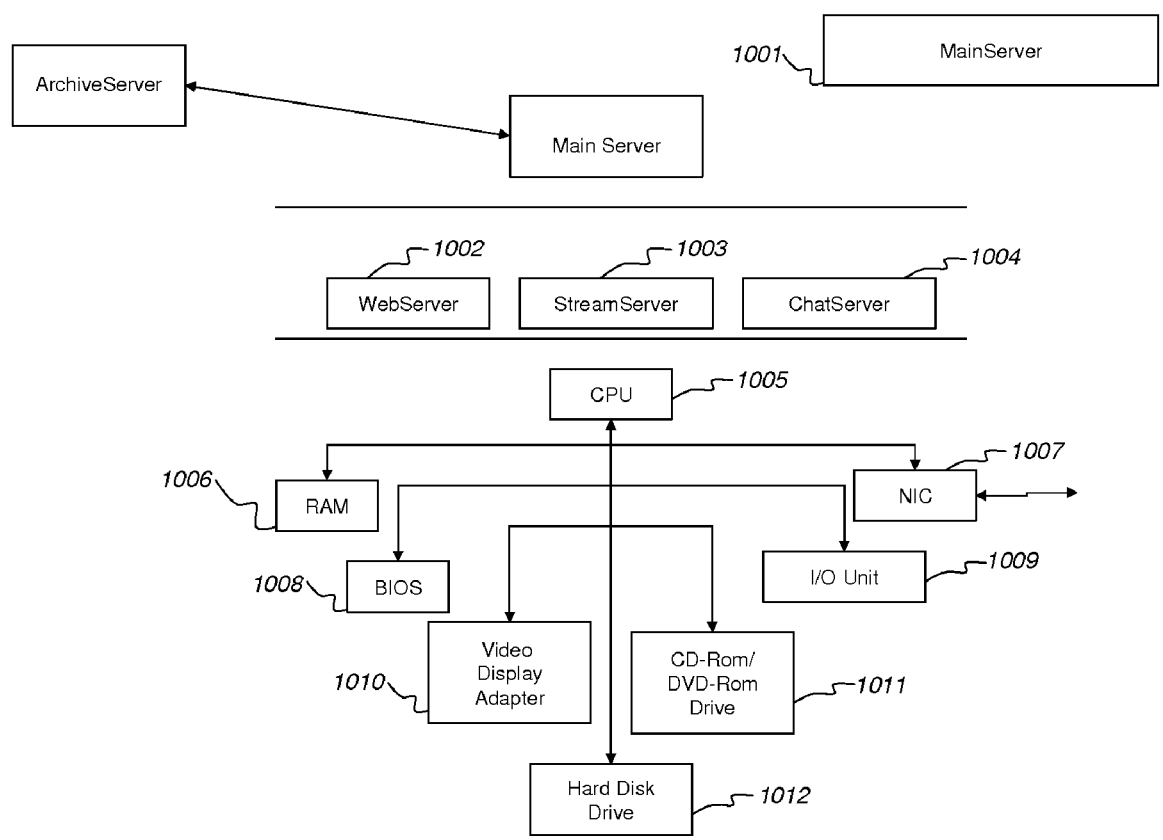
FIG. 10 schematically shows the Main Server configuration including the three component servers within the Main Server and the system architecture needed for the present invention.

Description FIG. 10 Main Server (Module:1001) This Figure explain a typical specification of Main server which is central module of this system. Main Server (Module:1001) is home of 3 application servers: WebServer (Module:1002), StreamServer (Module:1003) and ChatServer (Module:1004). WebServer (Module:1002) takes care of website contents, user authentication information, easy site traversal, and other miscellaneous issues related to website. StreamServer (Module:1003) is responsible for managing streams of TeleCasts, and other live casts (live and archive), this module is responsible for fetching information from either Stream Archive Server (Module:109) or Live Streaming feed from Presenter PC (Module:501). Process this feed by wither adding advertisement strip at the required location or fetch information for smart advertisement engine for smart advertisement and information push. ChatServer (Module:1004), is responsible for managing LiveChats, the question and answer session or any live text interactions between client with server and/or client with arcive server. It also consist of filtration logic which is responsible for filtering the chat based on content, chat room profile and process the chats for audit screening, feedback, adaptive learners (logic used to fine tune advertisement engines, logic to gather more information about user and their expected interaction). These three module are running on typical server system consisting of Server with HIGH CPU capability chipset (Module:1005) with updated BIOS (Module:1008), which may be based on current market standards for CPU intensive server systems. This system is also equipped with sufficient RAM (Module:1006) to handle large queue of information. NIC card is also installed on the system which consists of Ethernet interface and gigE interface to handle fast traffic and cope up with large number of users at particular time. I/O Unit (Module:1009) consist of all the sufficient modules required to manage the server (normally PS2 interface, Parallel port, USB slots, optical fiber interface and firewire). Archive Server will be connected with server through either optical interface or firewire for fast and non-compromising data transfer. CD/DVD Rom drive (Module:1011) is installed for taking occasional back-ups, playing CD/DVD based media files or installing $3^{rd}$ party software. Normal graphics card (Module:1010) is used for connecting main server with output device. HDD (Module:1012) used is of very high storage capacity with very high RPM rate for quicker access and optimal responses. This all comprise of main server which is responsible for all activities in this system.

Figure 11:
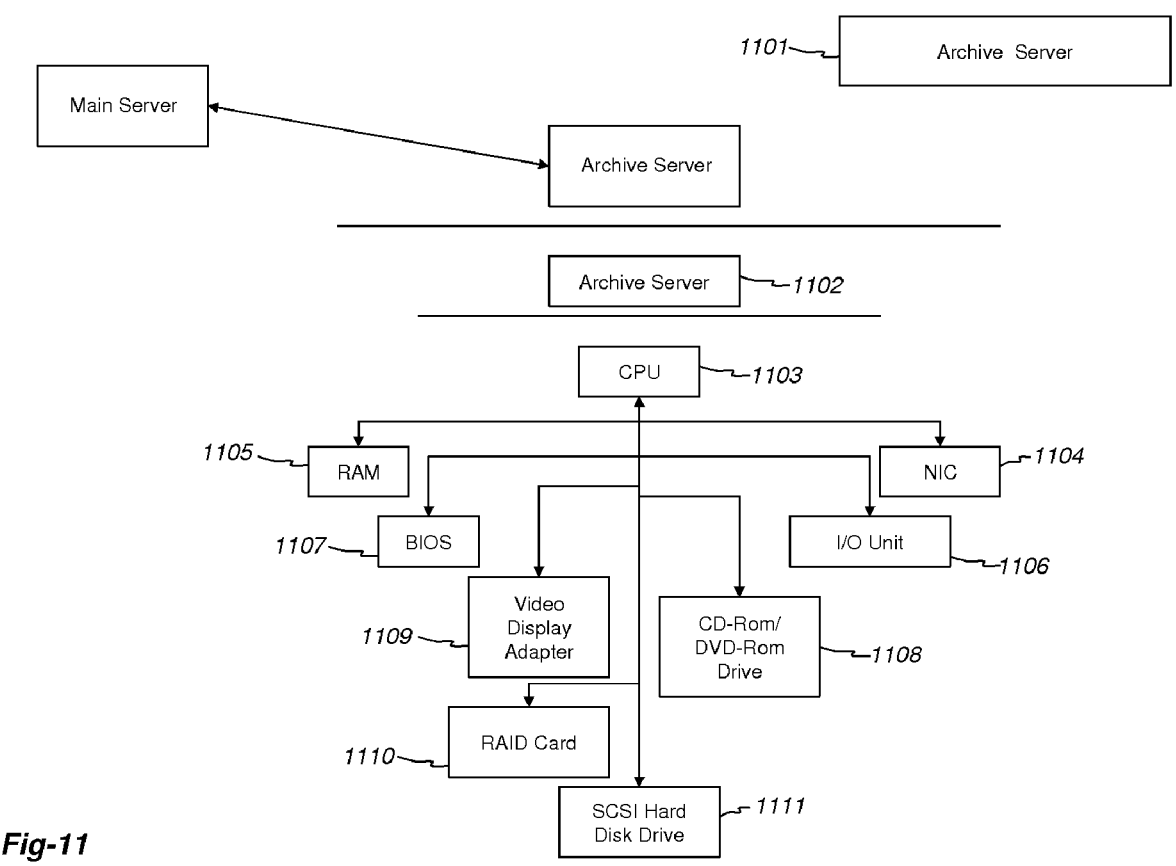
FIG. 11 schematically shows the Archive Server configuration including the system architecture needed for the present invention.

Description FIG. 11: Archive Server (Module:1101) This Figure explains a typical archive server used in our system. This system component is directly connected to Main Server through firewire and optical interface for fast data-transfer rates. On application level this system is running Archive Server code written in mix of third party tool, open source and tailored algorithm for managing archives of this system, which can be media stream, blogs, user information, server activities, system activities and other information which may be needed for future processing. System components used are similar in capability as described in Main Server (Module:1001). CPU (Module:1103), NIC card (Module:1104), RAM (Module:1105), BIOS (Module:1107), I/O Unit (Module:1106), CD/DVD Rom Drive (Module:1108), Video Display Adapter (Module:1109) are used as similar in configuration as used in main-server. Interface for HardDrive used is a SCSI interface for fast and reliable data transfer (Module:1111), RAID Card (Module:1110) is also used for altering server capacity without bringing system down at any point in time and use hot-swappable HDD.

Figure 12:
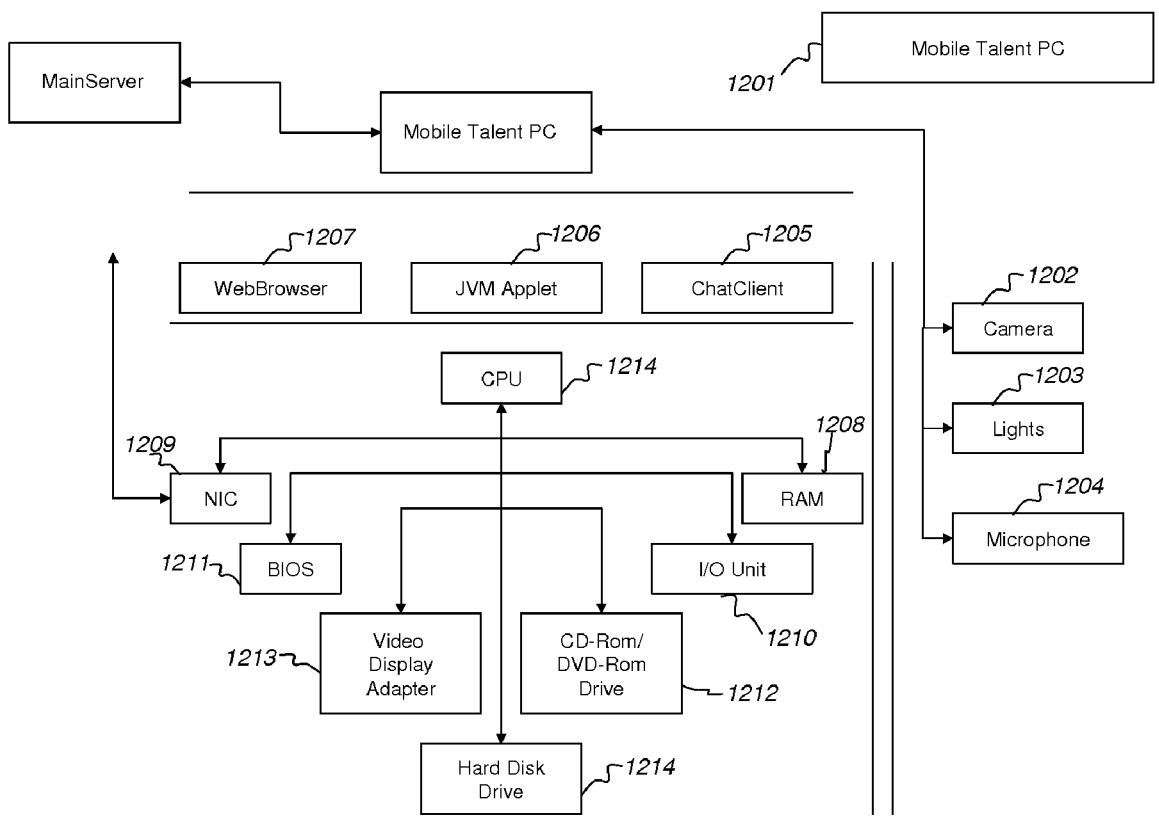
FIG. 12 schematically shows the Mobile Talent PC configuration including the three component systems within the Mobile Talent PC and the system architecture and interaction with other mobile talent host station hardware needed for the present invention.

Description FIG. 12: Mobile Talent PC (Module:1201) This system component reside with talent PC and works as mobile studio manager for making it possible to start a studio with minimal accessories. This component is directly connected to main server through Ethernet interface over IP Cloud. On application level normally this component is running 3 applications: WebBrowser (Module:1207) for opening client and establishing connectivity with main-server. JVM applet (Module:1206) consisting of plugins to various tools required for managing Talent PCs environment. Which are managing the question and answer chat, displaying rating information, management console for managing Studio environment camera connectivity (Module:1202), Lights (Module:1203) and audio microphone (Module:1204)). Presenter should be able to manage all those components through their management consoles. This console is also used to start a self test on the system to make sure studio is working as it is expected to work and result is also reported to concerned authorities so that they can track the system activity and make sure of non-compromised quality. ChatClient (Module:1205) is another client which will display Presenter with Chat and the question and answer session, this will provide extra privileges to Presenter for marking and flagging any question in the question and answer session and do various activities on the text like highlight, removing, raising icons to gain more attentions, however on user chat he is given similar privileges as of normal user. On system level this component consist of a lightweight device with very sophisticated system modules like fast CPU Processor (Module:1214) with latest BIOS firmware to handle future updates (Module:1211), NIC (Module:1209) card for connecting to main-server, large RAM (Module:1208) so that all the application can run on the system without much impact on the performance and response rate, I/O unit (Module:1210) are typical unit used in such systems, Video adaptors (Module:1213) are very sophisticated with sufficient internal ram to handle live feed from camera and processing that information for streaming it to streaming server located in main-server. Normal capacity HDD (Module:1214) are used for such system as major task is manage limited number of modules and send information to main-server.

Figure 13:
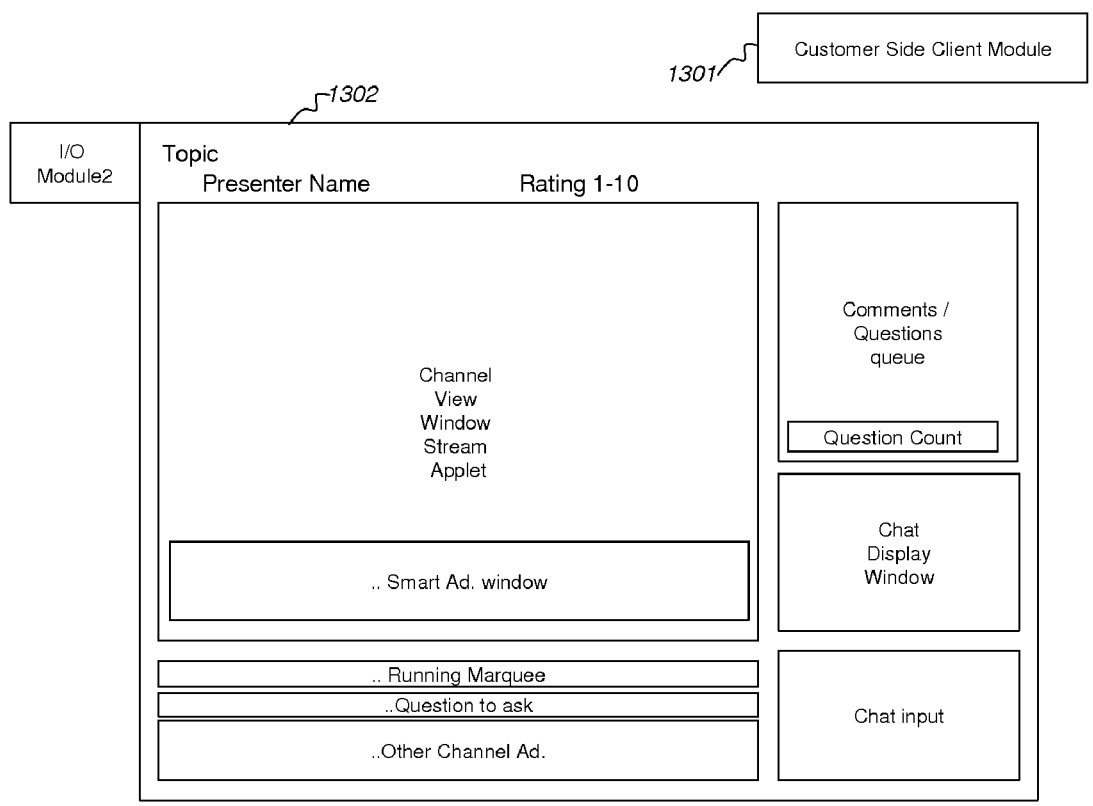
FIG. 13 shows a physical embodiment of the viewer side client module.
Figure 14:
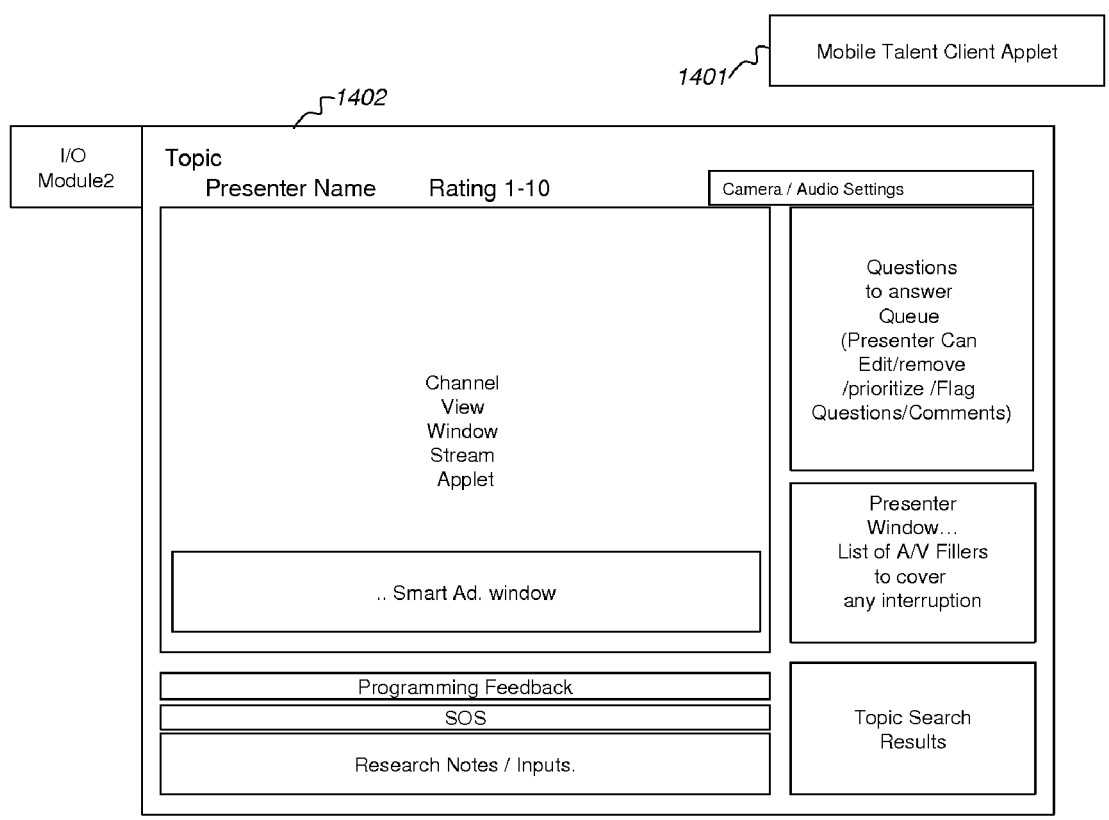
FIG. 14 shows a physical embodiment of the mobile talent client applet module.

FIG. 13 and FIG. 14 shows typical window Customer Side Client Module (Module:1301) and Mobile Talent Client Applet (Module:1401) as seen by user and talent respectively. They represents typical windows which has all the required modules which will be used by user and talent while interacting with the system.

Figure 15:
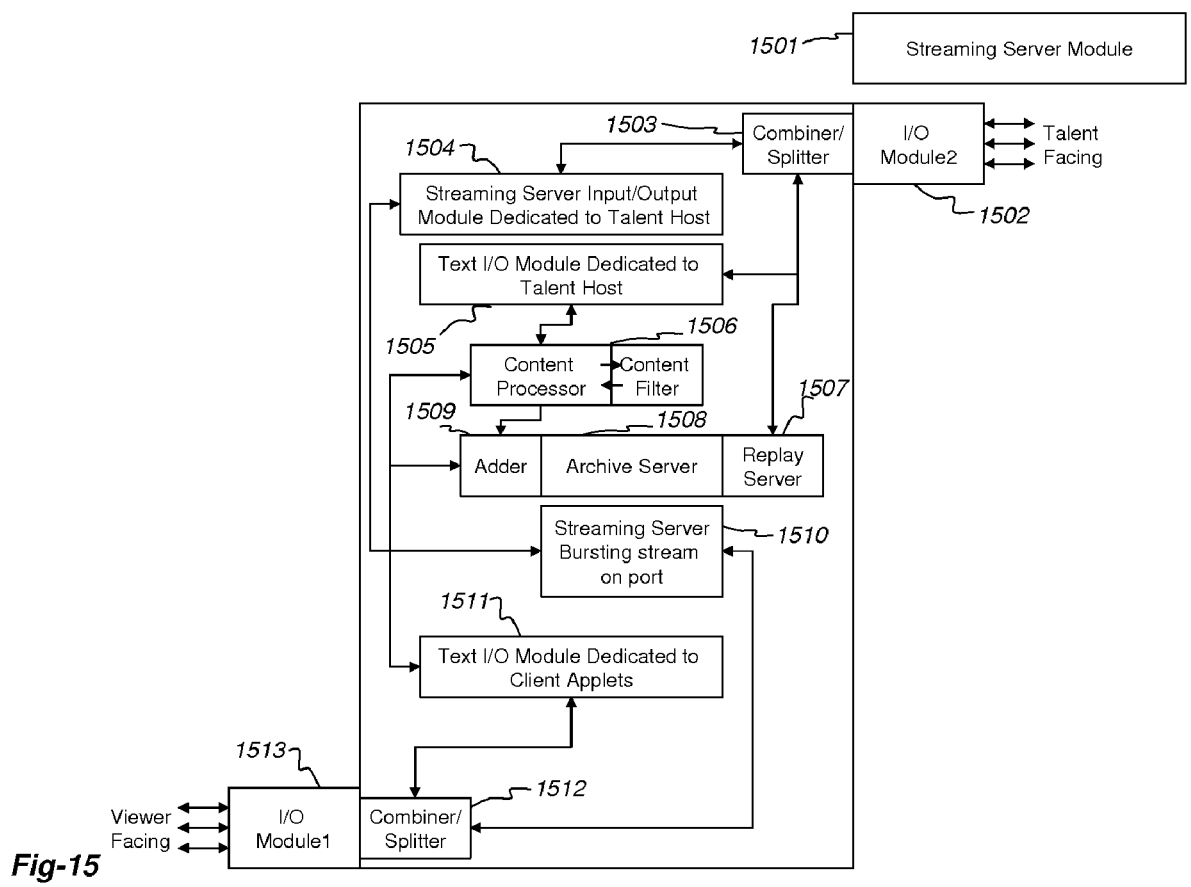
FIG. 15 shows a schematic diagram of the streaming server module.

Description FIG. 15: Streaming Server Module (Module:1501) This is a typical scenario explaining how stream and information are clubbed together and managed in this system. Streaming Server Module is linked with Viewer and Talent at the same time using different IO Modules: IOModule1 (Module:1513) facing user/viewer and IOModule2 (Module:1502) facing talent. Both of these modules are linked with combiner/splitter module (Module:1512 and Module:1503 for user and talent side respectively). These combiner/splitter modules are responsible for adding removing extra information to existing streaming (e.g. small strip of information at the base, provision for advertisements on video, logo etc.). From User Combiner/Splitter module and Text I/O is send to Text I/O module dedicated to Client applet (Module:1511), which is then send to content processor which has inbuilt content filter (Module:1505) and after making sure content is safe to use, this content is added to archiving stream using adder (Module:1509) to archive it in archive server (Module:1508), which when queried is shown using replay server (Module:1507). This replay stream is then mixed with I/O text from talent window mixed in Combiner/splitter module (Module:1503) facing talent and broadcasted to streaming server through Streaming Server Bursting Stream on port module (Module:1510) send to Combiner/Splitter Module (Module:1512) and sending it out on I/O Module 1 facing user (Module:1513).

Figure 16:
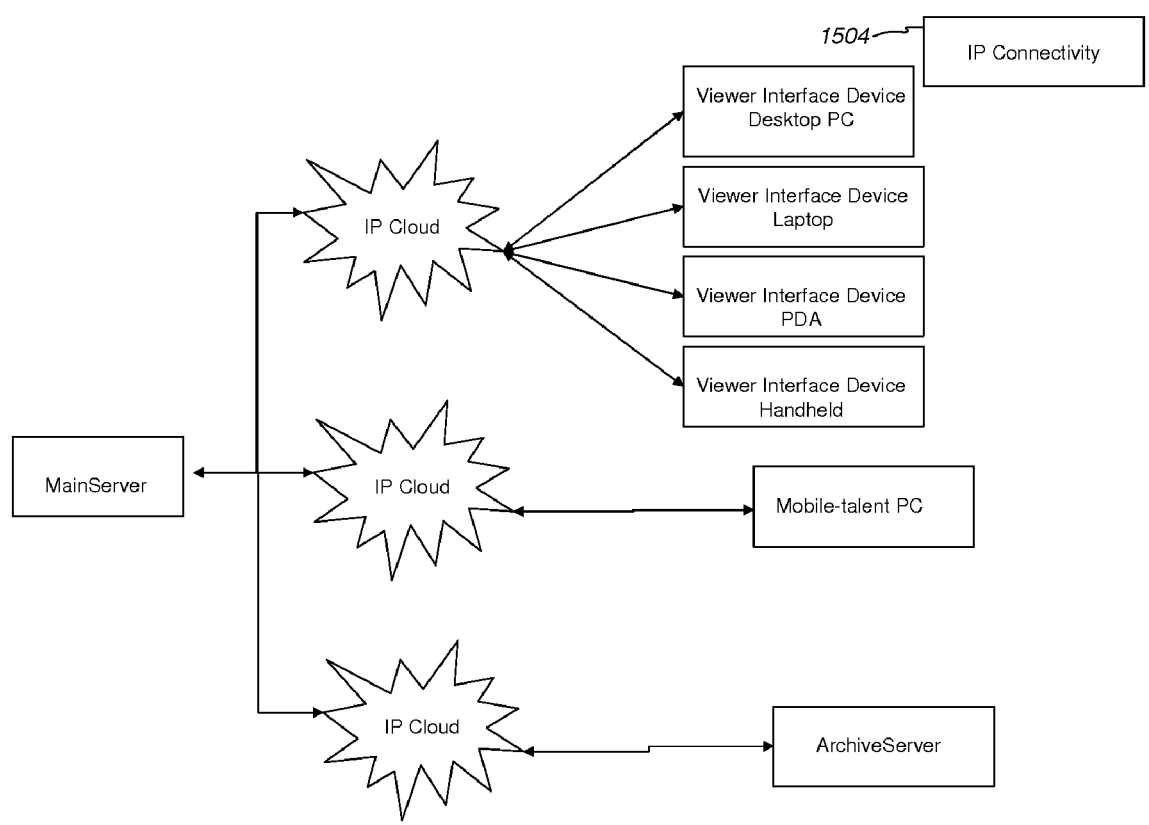
FIG. 16 schematically shows the IP connectivity of the various components of system required by the present invention.

Description FIG. 16: IP Connectivity (Module:1504) Main Server is connected to viewer interface device (Desktop PC, Laptop, PDA, other device handhelds), talent PC and in some cases Archive server through IP Cloud. Although this will be redundant archive server, a similar server should be kept closer to main-server connected through firewire/optical interface.

For the purpose of teaching of the invention, a preferred embodiment of a system and methods of the invention are described in the sequel. It is appreciated by the person skilled in the art that other alternative and equivalent embodiments of the invention can be conceived and reduced to practice without departing from the true spirit of the invention, the scope of the invention being limited only by the appended claims.

FIG. 1 schematically shows the architecture of an example embodiment of the system of the present invention. As can be clearly viewed from FIG. 1, the business processes or functions have several interdependencies, indicated by the arrow links between the processes. An erroneous operation of one or a plurality of the processes will have an impact on the operation or execution of another or a plurality of other processes.

As FIG. 1 shows, a viewer on a computer or device connected to the internet comes on line (001) to the talent-host web site. On the home page, the viewer can select from among multiple talent-persons, each experts in their respective areas such as cooking, golf, literature, computers, publishing, politics, entertainment, comedy, farming, or finance.

Upon viewer's selecting the particular talent-person or subject matter placed in calendar format, or (002 and FIG. 3) searching on for a talent-person or subject matter, the viewer is taken to the web page displaying a particular talent-person. Each of the talent-persons are speaking live about a particular subject matter through a camera and microphone which is transmitted to the viewer over the web to the viewer's internet device. In the event the subject matter sought by the viewer is an archived event or future event (003), the system displays the past content or the schedule of the future events.

As displayed in FIG. 5, while the talent-person is speaking live to the viewers, the viewers are able to make comments or ask questions by inputting text data into a chat process on the talent-person's web page. As displayed in FIG. 6, all viewers are able to see comments or questions, selected by the talent-person.

The talent-person assigns flags to the viewer comments or questions for example "comment/question is being addressed," "next question to be answered" "comment/question to be addressed in the next session," "Good Question," "Stupid Question" (See FIG. 8). The viewer is provided a choice of using an optional self-assigned name or system-assigned random name for the purpose of identifying comments or questions and chat inputs to the viewer to viewer chat. (See FIG. 9) Also, viewers can assign a rating of enjoyment or dislike of the talent-person's communicated content (FIG. 3) to the live talent-person in real time. The average rating is displayed on the web internet device of the viewer and talent-host mobile PC in real time.

The viewers are able to see the queue of viewer comments and questions addressed to the talent-person (see FIG. 6). The viewers are also able to communicate among themselves via the internet (see FIG. 9). The total count of pending comments and questions are displayed on the viewer's internet device and on the mobile talent host PC. The viewer to viewer chat displays on the viewers' internet devices in a chat display window on the viewers' internet devices and on a mobile talent-host PC (See FIG. 9 and FIG. 13). During any viewing of archived content, the viewer may initiate a personal chat session with other viewers by using an automated link to invite them to view the same content and share their thoughts within the personal chat session (See FIG. 4).

As described in FIG. 14 and FIG. 7, a web page displayed only to the talent-person and on talent-host system and not to the viewers, there is a mobile talent client applet that displays the lights, camera and sound settings and adjustment controls for the talent-person to check and adjust as required to provide the best image and sound in the streaming window.

Figure 17:
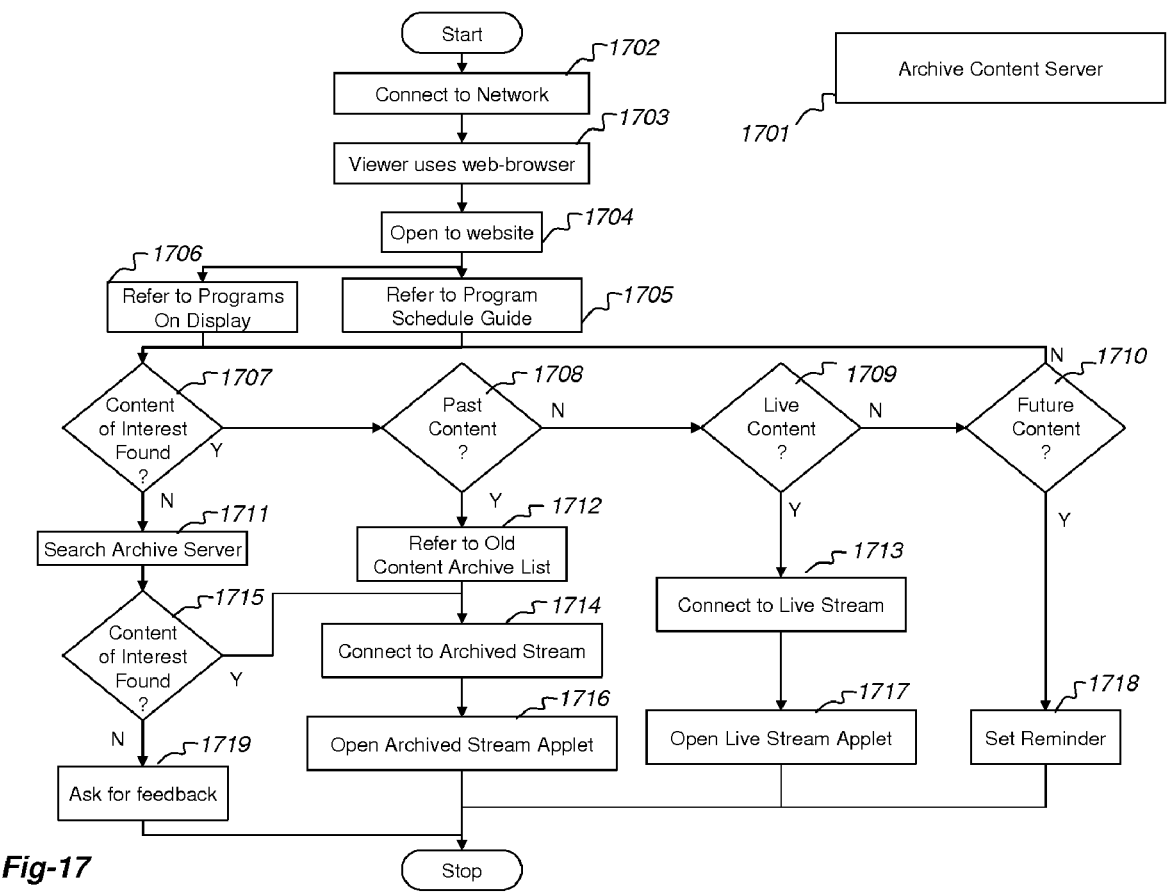
FIG. 17 shows the process used by the system to identify the content of interest to the viewer and provide the option of viewing the same from either archived content server or live feed.

In order to provide viewing options, the viewer may initiate on the viewer's web page a full screen mode of display, which expands the streaming feed window and the smart ad window to full screen, while hiding other windows such as comment/question, chat, or running marquee window. See FIG. 17. From the talent-host system, the talent-person is provided access to internal feedback on the content and presentation, options for conducting topic related searches, or requesting help with the topic or related questions.

For breaks during the live content sessions, talent-host system provides the talent-person with the ability to replace live audio/visual feed with other pre-recorded audio/visual streaming files related to the topic. See FIG. 17. The talent person can choose to replace live audio/visual feed with other pre-recorded advertising audio/visual messages at regular intervals.

Figure 18:
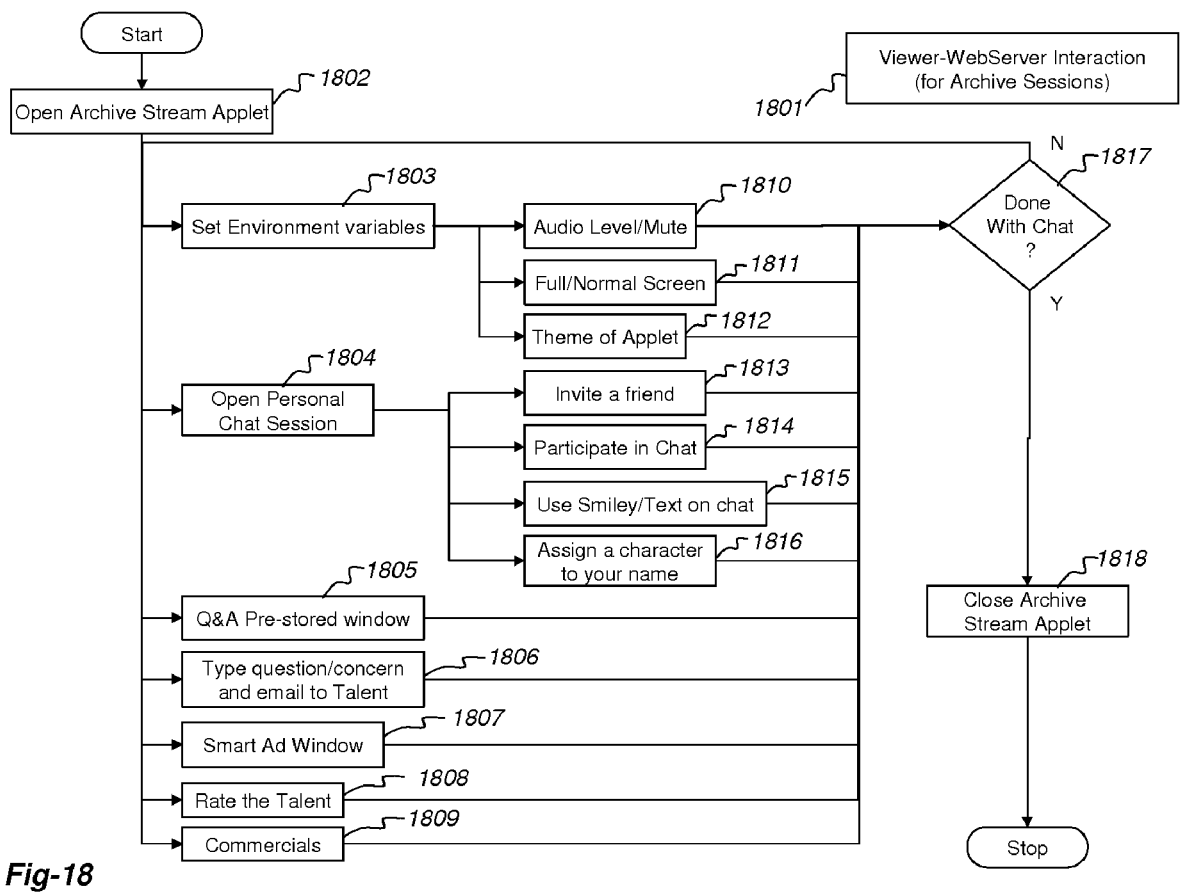
FIG. 18 shows the process of viewer interaction with the web server for viewing archived content.
Figure 19:
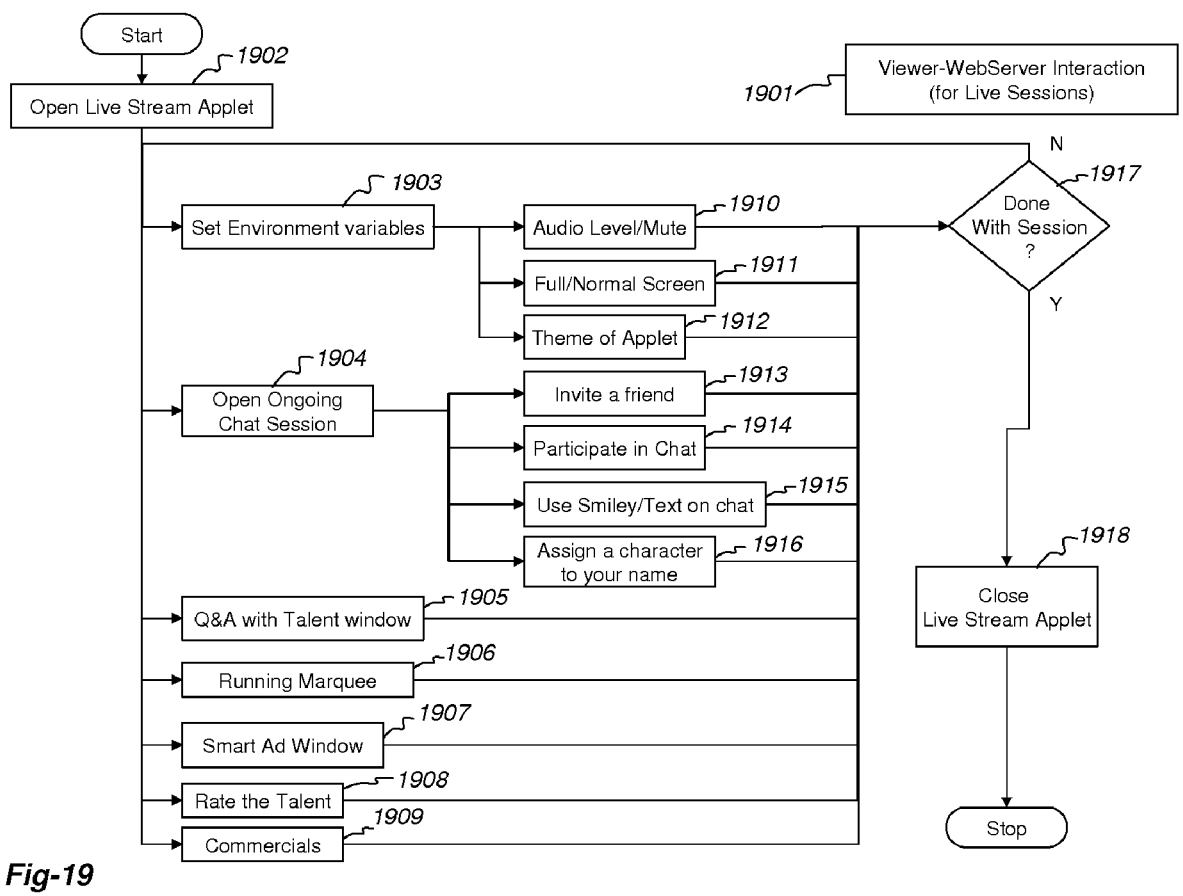
FIG. 19 shows the process of viewer interaction with the web server for viewing live streaming content.
Figure 20:
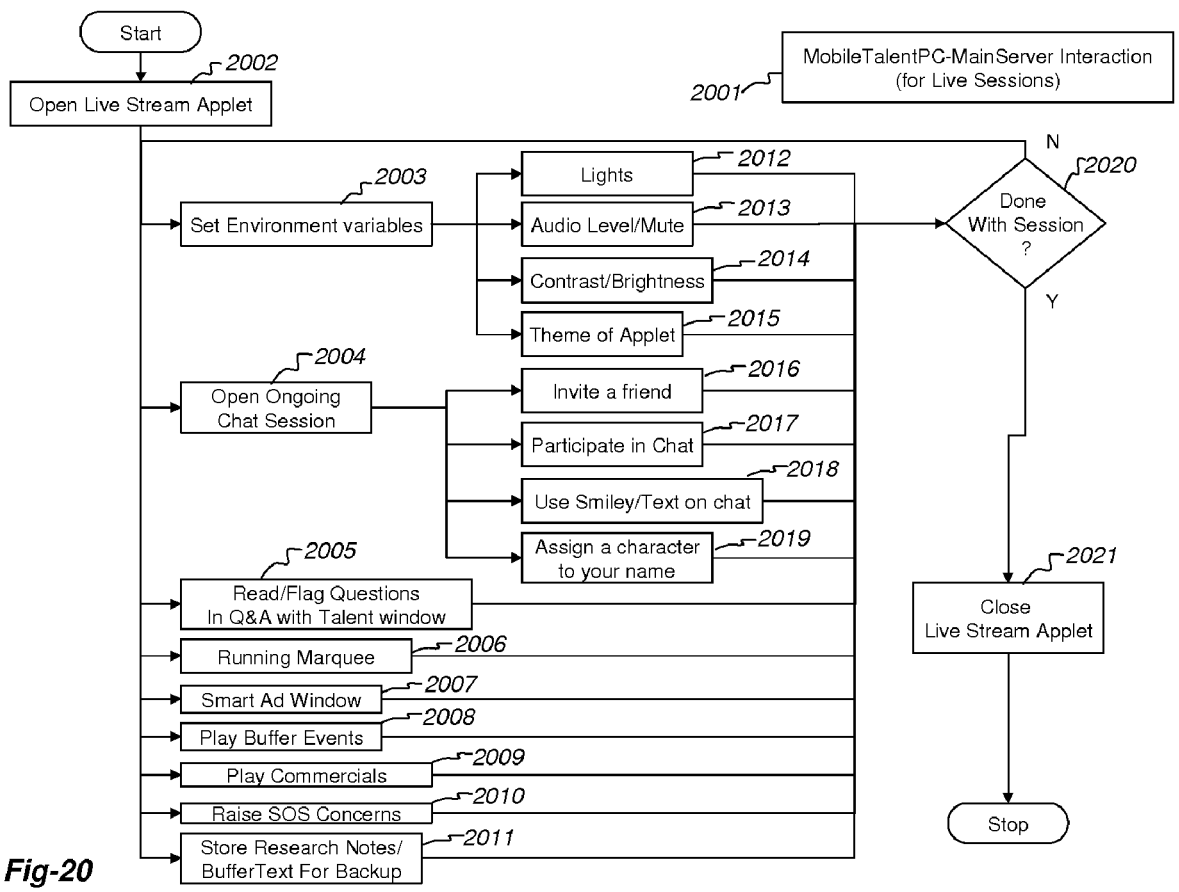
FIG. 20 shows the process of the Mobile Talent PC's interaction with the Main Server for setting up the various interconnections and creating streaming feed for providing the content of the viewer side client module (FIG. 13) and Mobile Talent Client Applet (FIG. 14)
Figure 21:
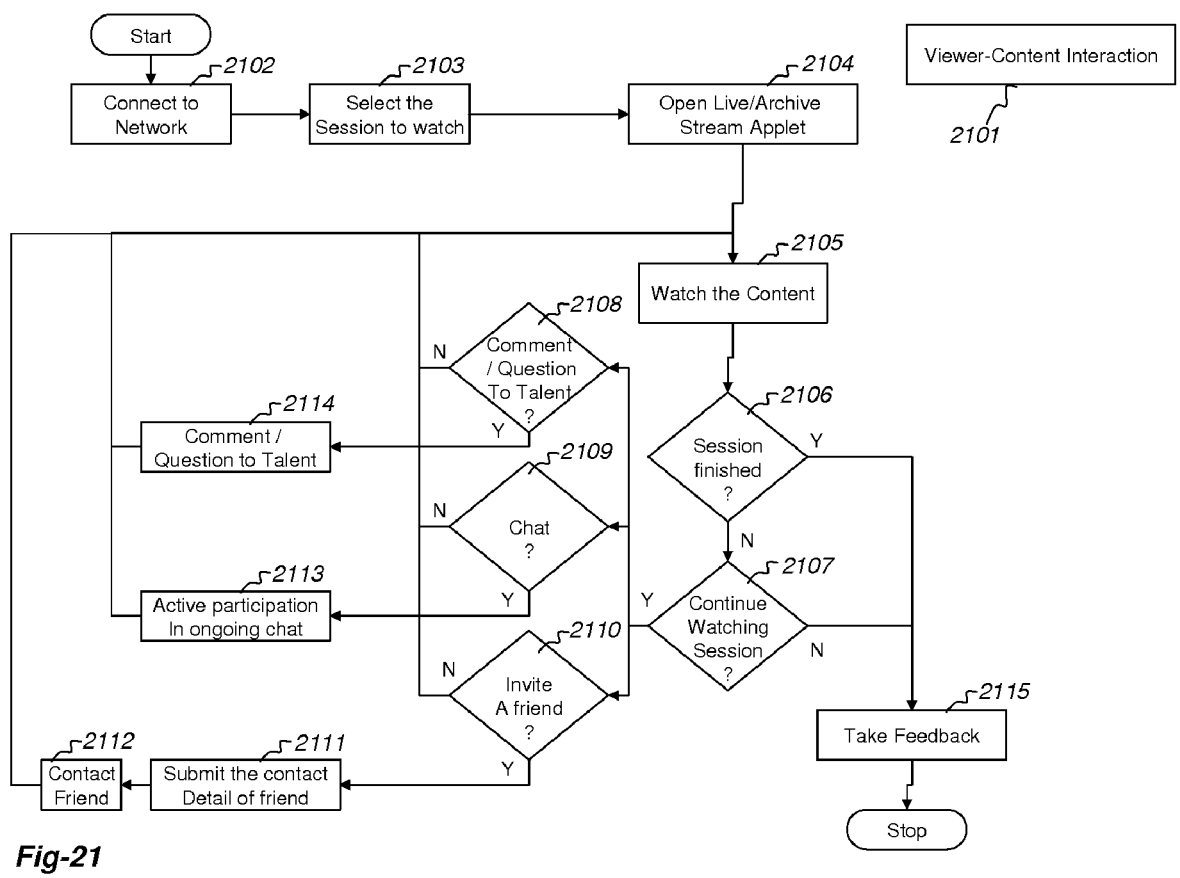
FIG. 21 schematically shows the process of the viewers interaction with the system to obtain or update the content feed and other components of the viewer side client module (FIG. 13) on the viewer's internet device.
Figure 22:
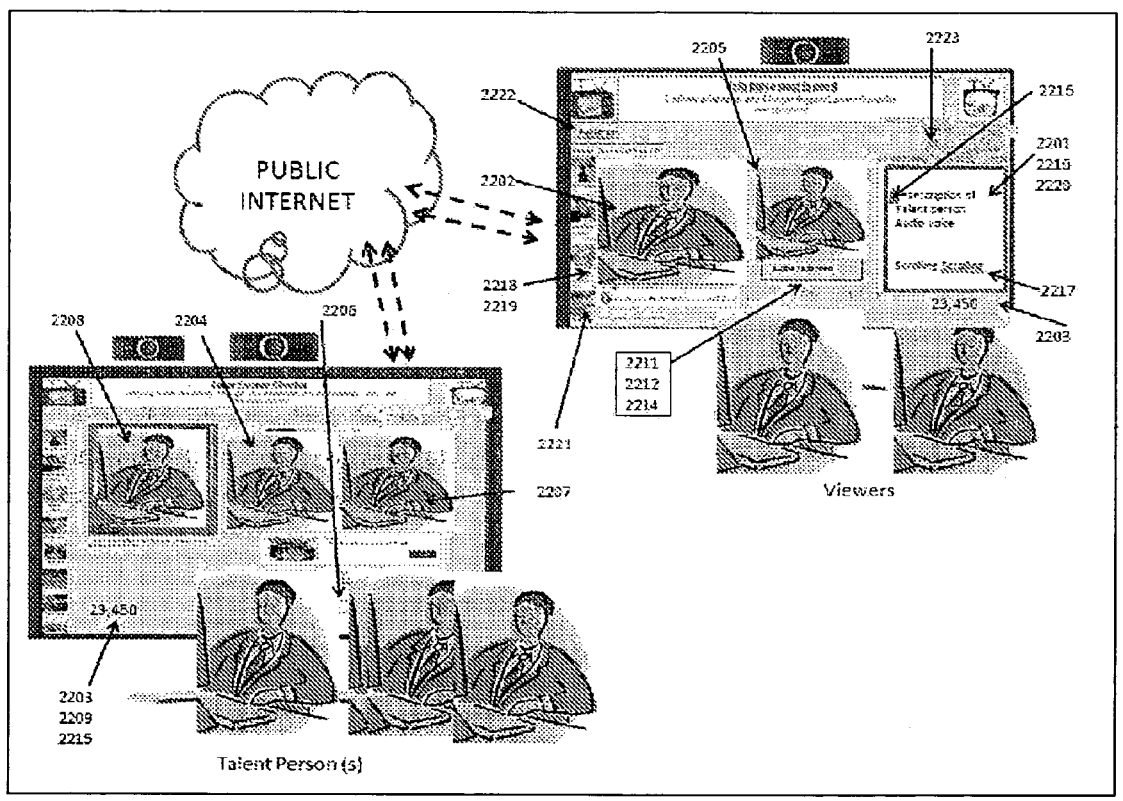
FIG. 22 schematically shows the Internet browser view that viewers will view and communicate with the talent person over the public Internet using an open system that does not require a login or access.

The monitoring agent comprises a knowledge module, operating with a business flow monitor and a component monitor for collecting data providing information about the operation of the business processes and the hardware and software components. FIG. 22 shows the talent-person communication to the viewer is through a real-time text transcription 2201 of all the audio communication from the talent-person to the viewer transmitted in real-time from the talent-person's end to the viewers' computer device's Internet browser and displayed on the viewer's device on the Internet browser through the internet. FIG. 22 shows the talent-person reading or listening 2202 to the viewer's comment or question sent through the internet from the viewer's computer through the Internet browser and, if the talent-person so desires, responds to the comment or question verbally and visually through a live audio-visual communication over the internet. FIG. 9 shows the communication of the verbal and visual response to the single viewer's comment or question is directed and available to all the viewers of the talent-person watching and listening to the talent-person on multiple viewers' 909 computer devices. FIG. 13 shows the process of the viewers rating the live talent-person according to whether the viewers are enjoying the talent-person using a scaled numbering system, such as 1 to 10, and the results of the ratings are posted on the talent-person's individual web page in real-time 1302 and are displayed in real-time for both the viewers and for the talent-person to read while the talent-person is communicating to the web audience. FIG. 22 shows the number of viewers reported as determined through a process and the number of viewers displayed 2203 for both the viewer-audience and the talent-person to read while the talent-person communicates to the web audience. FIG. 22 shows talent-person joined by a second talent-person 2204 located with the first talent-person in the same physical room location or located in another location anywhere in the universe and both talent-persons communicating with each other and with the viewing audience on the web page in a split screen on the web page 2205. FIG. 22 shows the talent-person joined by a more than two talent-persons located in the first talent-person's same physical room location or located in other physical and geographical locations 2205 anywhere in the universe and all talent-persons communicating with each other and with the viewers on the web page in a split screen format on the web page. FIG. 22 shows the first talent-person and the 2nd talent-person 2206 communicating with each other live through speaking or through chat text on the talent-persons' screens. FIG. 22 shows the first talent-person and the more than two talent-persons communicating with each other live through speaking or through chat text on the talent-persons' screens 2207. FIG. 13 shows the process where the talent-person views a controller web page which is created for the talent-person and is different from the web page created for the viewers 1302. FIG. 22 shows the talent-person controller web page displaying a small screen showing a web image of the talent-person 2208 in order that the talent-person can see what the talent-person looks like on camera. FIG. 22 shows where the talent-person controller web page displaying adjustment controls on the talent-person's web page 2208 allowing the talent-person to adjust brightness and contrast of the camera's video delivery using software controls. FIG. 20 shows the process the talent-person controller web page displays adjustment controls on the talent-person's web page allowing the talent-person to adjust brightness and contrast of the camera's video delivery using software controls 2014. FIG. 20 shows the process where the talent-person controller web page displays adjustment controls on the talent's web page allows the talent-person to view the audio delivery in order to adjust the microphone's audio delivery using software controls 2013. FIG. 6 and FIG. 14 show the process whereby the talent-person controller web page displays an area displaying the queue of chat text comments 605 or questions 1402 delivered from viewers. FIG. 13 shows the process where the talent-person controller web page displays the count of the number of comments or questions in the queue and displays the count number in the queue 1302 to the talent-person. FIG. 14 shows the process whereby the talent-person controller web page has a method 1402 of allowing the talent-person to select viewers' comments or questions which appear on the web devices of the multiple viewers. FIG. 2 shows the process where the talent-person controller web page displays a chat text area allowing the talent-person to type chat messages to a person who is the director of talent-persons (or "talent-director") to ask questions about the program and to communicate 210 with the director of programming to read such instructions as "smile" or "you're doing great." FIG. 18, FIG. 19, and FIG. 14 show the process where the talent-person controller web page displays an area displaying the real-time feed back rating 1808, 1908, 1402 of the viewers. FIG. 22 shows the talent-person controller web page displays an area displaying the number of viewers 2209 watching the talent-person. FIG. 13 shows the process 1302 where the viewers are presented with web page displaying an area to view the live audio-visual feed of the talent-person. FIG. 22 shows the viewers being presented with web page displaying an area to view the transcription of the live audio-visual feed of the talent-person and comments or questions from viewer-audience 2210 in audio or audio-visual form. FIG. 13 shows the process where the viewers are presented with web page displaying an area to input text 1302 for sending a comment or question to the talent-person. FIG. 22 shows: a) where the viewers are presented with web page displaying an area to input audio recorded message 2211 for sending a comment or question to the talent-person; b) where the viewers are presented with web page displaying an area to input audio-visual recorded message 2212 for sending a comment or question to the talent-person: c) where the viewers are presented with web page displaying an area to input a live audio-visual stream 2214 for communicating a comment or question to the talent-person; and d) where the viewers are presented with web page displaying the number of viewers 2215 viewing the talent-person. FIG. 13 shows the process wherein the viewers are presented with web page displaying a field 1302 in which viewers are able to rate talent-person and to view the total average rating by the total viewers, and the process where the viewers are presented with web page displaying the questions queue 1302 as questions to be displayed to the viewers. FIG. 22 shows the viewers being presented with web page displaying a flag assigned to the comment or questions selected by the talent-person's controller web page indicating ratings 2216 selected by the talent-person. FIG. 22 also shows the viewers being presented with web page displaying a scrolling text message 2217 displaying any content selected by the talent-person or talent-director to be displayed. FIGS. 13, 18, 19, 20, and 4 show the process where the viewers input text in a chat display that is a comment and/or question for the talent-person speaking and being seen live audio/visually on the viewers web devices and that inputted text is delivered to a software that processes the text with an algorithm method 1302, 1807, 1907, 2007, 408 and searches the data base stored by the talent-person's server to locate the appropriate web link offering services or products relevant to the inputted text. FIGS. 13, 18, 19, 20, and 4 show the process where the results of the search of the talent-host data base by the search software deliver to the viewers' web devices a line or multiple lines of text with hyperlinks displaying the name of the advertiser and the advertiser's product or service description 1302, 1807, 1907, 2007, 408 allowing the viewers to click on the hyperlink and connect to the advertiser's web site, and show the process where a viewer selects on the hyperlink and connects to the advertiser's web site, the talent-person's server records the selection 1302, 1807, 1907, 2007, 408 and, through a prior arrangement with the advertiser, charges the advertiser for the viewer's selection. FIG. 13 shows the process where the results of the database search by the search software deliver to the viewers' web devices a line or multiple lines of text anticipating the viewers' intentions 1302 and interest and educates and entertains the viewers. FIG. 9 shows where an individual viewer may, as a viewer's option, create a name to identify the viewer 903 so that the talent-person is able to identify the created name in conjunction with the viewer's comment or question. FIG. 22 shows where the talent-host server displays digitally an advertisement behind, next to, or in front of 2218 the talent-person where such advertisement is seen by the viewers on their web devices, and where the process uses a speech-to-text software to translate the talking of the talent-person to text 2220 to be used for various purposes. FIGS. 13, 18, 19, 20, and 4 show the process where the text of the talent-person's talk is used by the computer software in the talent-person's server to determine the appropriate advertisement to place at the bottom of the page 1302, 1807, 1907, 2007, 408. FIG. 22 shows where the home web page is displayed to the viewer-audience displays multiple channels 2221 available for viewing with live talent-persons moving in each small webcam image allowing the viewer-audience to click on one of the talent-person webcam images and cause the web page to change to a page exclusively dedicated to the talent-person clicked on by the viewer-audience person. FIG. 22 shows where the talent person page displayed to the viewers displays an option for other viewing modes including a full screen 2222 talent-person screen option where only the live feed from the talent-person occupies the full viewers device's display screen and all other display areas are eliminated. FIG. 22 also shows where the talent-person places information relevant to the topic being discussed, such as recipes, maps 2223, formulas, or photos, with the purpose of visually explaining the topic, on the talent-person's web display which is then displayed on the multiple viewers' internet devices While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

We claim:

1. A method of entertaining and teaching over the public, World Wide Web (www) Internet which i) is open to an unlimited number of viewers on the public Internet using standard Internet protocols, ii) the viewers may use a multitude of different types of Internet browsers and a multitude of different Internet media audio/video players in the viewer's Internet browsers to view the talent-person, and iii) does not require the viewers to authenticate themselves through a login to a system with a unique code in order to view the talent-person and comprising: (a) the talent-person, who is a teacher, entertainer, or expert, ("talent-person") discussing a topic live, in real-time video and audio over the internet; b) the talent-person using streaming audio/video where multiple viewers watch and listen to the talent-person entertain and teach on the viewer's internet connected device; c) displaying to viewers over the internet the talent-person visually and the talent-person's audio voice; d) viewers interacting with the talent-person by asking questions or making comments to the talent-person with web-based text chat; and, e) talent-person responding to the viewers' text chat messages by speaking on a microphone and camera transmitting an audio/video picture and sound of the talent-person over the internet to multiple viewers watching and listening to the talent-person on the viewer's internet connected device.

2. The method of claim 1, wherein the means of communicating by the talent-person to the viewers is through a camera and microphone connected to a mobile computer at the talent-person's location and the viewer's device connected to the public internet.

3. The method of claim 1, wherein the means of communicating by the talent-person to multiple viewers is through a combination of video and audio streaming with the talent-person speaking to the viewers and being seen by the viewers in real time, live on the viewer's device over the internet.

4. The method of claim 1, wherein the means of communicating by the viewers to the talent-person is through a text chat message sent from a web site at the viewer's end to the talent-person through the internet.

5. The method of claim 1, wherein the talent-person reads or listens the viewer's comment or question sent through the internet from the viewer's computer and, if the talent-person so desires, responds to the comment or question verbally and visually through a live audio-visual communication over the internet.

6. The method of claim 5, wherein the communication of the verbal and visual response to the single viewer's comment or question is directed and available to all the viewers of the talent-person watching and listening to the talent-person on multiple viewers' computer devices.

7. The method of claim 1, wherein the viewers rate the live talent-person according to whether the viewers are enjoying the talent-person using a scaled numbering system, such as 1 to 10, and the results of the ratings are posted on the talent-person's individual web page in real-time and are displayed in real-time for both the viewers and for the talent-person to read while the talent-person is communicating to the web audience.

8. The method of claim 1, wherein the number of viewers is determined through a process and the number of viewers is displayed for both the viewer-audience and the talent-person to read while the talent-person is communicating to the web audience.

9. The method of claim 1, wherein the talent-person is joined by a second talent-person located with the first talent-person in the same physical room location or is located in another location anywhere in the universe and both talent-persons communicate with each other and with the viewing audience on the web page in a split screen on the web page.

10. The method of claim 1, wherein the talent-person is joined by a more than two talent-persons located in the first talent-person's same physical room location or located in other physical and geographical locations anywhere in the universe and all talent-persons communicating with each other and with the viewers on the web page in a split screen format on the web page.

11. The method of claim 9, wherein the first talent-person and the 2nd talent-person communicate with each other live through speaking or through chat text on the talent-persons' screens.

12. The method of claim 10, wherein the first talent-person and the more than two talent-persons communicate with each other live through speaking or through chat text on the talent-persons' screens.

13. The method of claim 1, wherein the talent-person views a controller web page which is created for the talent-person and is different from the web page created for the viewers.

14. The method of claim 13, wherein the talent-person controller web page displays a small screen showing a web image of the talent-person in order that the talent-person can see what the talent-person looks like on camera.

15. The method of claim 13, wherein the talent-person controller web page displays adjustment controls on the talent-person's web page allowing the talent-person to adjust brightness and contrast of the camera's video delivery using software controls.

16. The method of claim 13, wherein the talent-person controller web page displays adjustment controls on the talent's web page allowing the talent-person view the audio delivery to adjust the microphone's audio delivery using software controls.

17. The method of claim 13, wherein the talent-person controller web page displays an area displaying the queue of chat text comments or questions delivered from viewers.

18. The method of claim 13, wherein the talent-person controller web page displays the count of the number of comments or questions in the queue and displays the count number in the queue to the talent-person.

19. The method of claim 13, wherein the talent-person controller web page has a method of allowing the talent-person to select viewers' comments or questions which appear on the web devices of the multiple viewers.

20. The method of claim 13, wherein the talent-person controller web page displays a chat text area allowing the talent-person to type chat messages to a person who is the director of talent-persons (or "talent-director") to ask questions about the program and to communicate with the director of programming to read such instructions as "smile" or "stop picking your nose on the air" or "you're doing great."

21. The method of claim 13, wherein the talent-person controller web page displays an area displaying the real-time feed-back rating of the viewers.

22. The method of claim 13, wherein the talent-person controller web page displays an area displaying the number of viewers watching the talent-person.

23. The method of claim 1, wherein the viewers are presented with web page displaying an area to view the live audio-visual feed of the talent-person.

24. The method of claim 1, wherein the viewers are presented with web page displaying an area to view the transcription of the live audio-visual feed of the talent-person and comments or questions from viewer-audience in audio or audio-visual form.

25. The method of claim 1, wherein the viewers are presented with web page displaying an area to input text for sending a comment or question to the talent-person.

26. The method of claim 1, wherein the viewers are presented with web page displaying an area to input audio recorded message for sending a comment or question to the talent-person.

27. The method of claim 1, wherein the viewers are presented with web page displaying an area to input audio-visual recorded message for sending a comment or question to the talent-person.

28. The method of claim 1, wherein the viewers are presented with web page displaying an area to input a live audio-visual stream for communicating a comment or question to the talent-person.

29. The method of claim 1, wherein the viewers are presented with web page displaying an area to input a live audio only stream for communicating a comment or question to the talent-person.

30. The method of claim 1, wherein the viewers are presented with web page displaying the number of viewers viewing the talent-person.

31. The method of claim 1, wherein the viewers are presented with web page displaying a field in which viewers are able to rate talent-person and to view the total average rating by the total viewers.

32. The method of claim 1, wherein the viewers are presented with web page displaying the questions queue as questions to be displayed to the viewers.

33. The method of claim 1, wherein the viewers are presented with web page displaying a flag assigned to the comment or questions selected by the talentperson's controller web page indicating ratings selected by the talent-person 6 such as whether the question is ridiculous, a good question, or a comment that absolutely is not be addressed.

34. The method of claim 1, wherein the viewers are presented with web page displaying a scrolling text message displaying any content selected by the talent-person or talent-director to be displayed.

35. The method of claim 1, wherein the viewers input text in a chat display that is a comment and/or question for the talent-person speaking and being seen live audio/visually on the viewers web devices and that inputted text is delivered to a software that processes the text with an algorithm method and searches the data base stored by the talent-person's server to locate the appropriate web link offering services or products relevant to the inputted text.

36. The method of claim 35, wherein the results of the search of the talenthost data base by the search software deliver to the viewers' web devices a line or multiple lines of text with hyperlinks displaying the name of the advertiser and the advertiser's product or service description, allowing the viewers to click on the hyperlink and connect to the advertiser's web site.

37. The method of claim 35, wherein once a viewer selects on the hyperlink and connects to the advertiser's web site, the talent-person's server records the selection and, through a prior arrangement with the advertiser, charges the advertiser for the viewer's selection.

38. The method of claim 35, wherein the results of the database search by the search software deliver to the viewers web devices a line or multiple lines of text anticipating the viewers' intentions and interest and educates and entertains the viewers.

39. The method of claim 1, where in an individual viewer may, as a viewer's option, create a name to identify the viewer so that the talent-person is able to identify the created name in conjunction with the viewer's comment or question.

40. The method of claim 1, where the talent-host server displays digitally an advertisement behind, next to, or in front of the talent-person where such advertisement is seen by the viewers on their web devices.

41. The method of claim 40, where the web page displayed by the viewers is designed to allow the viewers to select on the webcam image of the talent-person and have the web page change to that of the advertiser content being displayed on the talent-person's live video image.

42. The method of claim 1, where the process uses a speech-to-text software to translate the talking of the talent-person to text to be used for various purposes.

43. The method of claim 40, where the text of the talent-person's talk is used by the computer software in the talent-person's server to determine the appropriate advertisement to place at the bottom of the page, for example, if the talent-person is talking about tennis and mentions good tennis rackets, the talk is translated into text, the computer system software uses the text to determine which tennis racket company advertisement to display on the web page viewed by the viewer-audience.

44. The method of claim 1, where the home web page displayed to the viewer audience displays multiple channels available for viewing with live talent persons moving in each small webcam image allowing the viewer-audience to click on one of the talent-person webcam images and cause the web page to change to a page exclusively dedicated to the talent-person clicked on by the viewer audience person.

45. The method of claim 1, where the talent-person page displayed to the viewers displays an option for other viewing modes including a full screen talent-person screen option where only the live feed from the talent-person occupies the full viewer's device's display screen and all other display areas are eliminated.

46. The method of claim 1, where the talent-person places information relevant to the topic being discussed, such as recipes, maps, formulas, or photos, with the purpose of visually explaining the topic, on the talent-person's web display which is then displayed on the multiple viewers' internet devices.

47. The method of claim 1, wherein the means of communicating by the viewers to the talent-person is through a recorded audio message clip created by the viewer on the viewer's computer device and transmitted from the viewer's end to the talent-person through the internet.

48. The method of claim 1, wherein the means of communicating by the viewers to the talent-person is through a recorded audio-video message clip created by the viewer on the viewer's computer device with a webcam and microphone and transmitted from the viewer's end to the talent-person through the internet.

49. The method of claim 1, wherein the means of communicating by the viewers to the talent-person is through a real-time, live audio-video communication initiated by the viewer on the viewer's computer device with a webcam and microphone and transmitted in real-time from the viewer's end to the talent-person through the internet.

50. The method of claim 1, wherein the means of communicating by the viewers to the talent-person is through a real-time, live audio communication initiated by the viewer on the viewer's computer device with a microphone and transmitted in real-time from the viewer's end to the talent-person through the internet.

51. The method of claim 1, wherein the means of communicating by the talent-person to the viewer is through a real-time text transcription of all the audio communication from the talent-person to the viewer transmitted in real-time from the talent-person's end to the viewers' computer device and displayed on the viewer's device through the internet.

* * * * *